(12) United States Patent
Adar et al.

(10) Patent No.: US 9,069,872 B2
(45) Date of Patent: Jun. 30, 2015

(54) RELATING WEB PAGE CHANGE WITH REVISITATION PATTERNS

(75) Inventors: Eytan Adar, Seattle, WA (US); Jaime B. Teevan, Bellevue, WA (US); Susan T. Dumais, Kirkland, WA (US); Daniel J. Liebling, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 677 days.

(21) Appl. No.: 13/287,929

(22) Filed: Nov. 2, 2011

(65) Prior Publication Data

US 2012/0047444 A1 Feb. 23, 2012

Related U.S. Application Data

(63) Continuation of application No. 12/163,149, filed on Jun. 27, 2008, now Pat. No. 8,078,974.

(51) Int. Cl.
*G06F 3/14* (2006.01)
*G06F 17/30* (2006.01)

(52) U.S. Cl.
CPC .................................. *G06F 17/3089* (2013.01)

(58) Field of Classification Search
CPC ..................................... G06F 3/14; G06F 3/17
USPC .......... 715/200–277, 700–867; 700/701–866; 709/201–229; 705/1, 50–79; 345/30–111; 707/104.1, 749
See application file for complete search history.

(56) References Cited

U.S. PATENT DOCUMENTS

| | | | |
|---|---|---|---|
| 6,052,730 A | 4/2000 | Felciano et al. | |
| 6,928,474 B2 | 8/2005 | Venkatesan | |
| 7,853,592 B2 | 12/2010 | Kwak et al. | |
| 2004/0189696 A1* | 9/2004 | Shirriff | 345/738 |
| 2004/0225687 A1 | 11/2004 | Larsson et al. | |
| 2005/0071766 A1* | 3/2005 | Brill et al. | 715/738 |
| 2005/0198191 A1* | 9/2005 | Carlson et al. | 709/217 |
| 2005/0257400 A1 | 11/2005 | Sommerer et al. | |
| 2006/0004704 A1 | 1/2006 | Gross | |
| 2006/0230055 A1 | 10/2006 | Marcjan et al. | |

(Continued)

OTHER PUBLICATIONS

U.S. Appl. No. 12/163,149, Mar. 17, 2011 Non-Final Office Action, total 4 pages.*

(Continued)

*Primary Examiner* — Ruay Ho
(74) *Attorney, Agent, or Firm* — Dan Choi; Judy Yee; Micky Minhas

(57) ABSTRACT

Web page change may be related to revisitation patterns to support web interaction. In an example embodiment, a method involves analyzing change and revisitation data for a web page, determining a relationship between the data, inferring consumption intent by a user for the web page, and utilizing the inferred consumption intent. More specifically, change data is analyzed to produce a change characterization, with the change data reflecting differences between content of a web page at different times. Revisitation data is analyzed to produce a revisitation characterization, with the revisitation data including visit times to the web page by a user. A relationship is determined between the change and the revisitation data based on the change and the revisitation characterizations. Consumption intent of the user for the content of the web page is inferred responsive to the relationship. The inferred consumption intent is utilized to support interaction with the web page.

20 Claims, 22 Drawing Sheets

(56) References Cited

U.S. PATENT DOCUMENTS

| | | | |
|---|---|---|---|
| 2006/0271834 A1 | 11/2006 | Wang et al. | |
| 2007/0033224 A1 | 2/2007 | Allen et al. | |
| 2007/0067304 A1 | 3/2007 | Ives | |
| 2007/0124693 A1 | 5/2007 | Dominowska et al. | |
| 2007/0156923 A1 | 7/2007 | Kumar | |
| 2007/0208828 A1* | 9/2007 | Brier et al. | 709/219 |
| 2007/0214150 A1 | 9/2007 | Chace et al. | |
| 2007/0250514 A1 | 10/2007 | Rajput et al. | |
| 2007/0255754 A1* | 11/2007 | Gheel | 707/104.1 |
| 2007/0288256 A1* | 12/2007 | Speier | 705/1 |
| 2008/0104502 A1* | 5/2008 | Olston | 715/229 |
| 2009/0024946 A1* | 1/2009 | Gotz | 715/769 |
| 2009/0254856 A1* | 10/2009 | Cwajbaum | 715/808 |
| 2009/0327914 A1 | 12/2009 | Adar et al. | |
| 2010/0250558 A1* | 9/2010 | Wang | 707/749 |
| 2011/0061001 A1* | 3/2011 | Jones et al. | 715/744 |

OTHER PUBLICATIONS

U.S. Appl. No. 12/163,149, Aug. 8, 2011, Notice of Allowance and Fees Due, total 5 pages.*

Adar, E. et al.; "Large Scale Analysis of Web Revisitation Patterns"; CHI'08; Apr. 5-10, 2008; Florence, Italy.

Aula A. et al.; "Information Search and Re-access Strategies of Experienced Web Users"; Proceedings of the 14th International Conference on World Wide Web (WWW'05); 2005; pp. 583-592.

Ayers, E.Z. et al.; "Using Graphic History in Browsing the World Wide Web"; World Wide Web Journal; Dec. 1995.

Catledge, L.D. et al.; "Characterizing Browsing Strategies in the World-Wide Web"; Proceedings of the 3rd International World Wide Web Conference; Computer Networks and ISDN Systems; vol. 27, No. 6; 1995; Darmstadt, Germany; pp. 1065-1073.

Change Detect Web Page Monitoring; http://www.changedetect.com; downloaded May 12, 2011.

Cho, J. et al.; "The Evolution of the Web and Implications for an Incremental Crawler"; Proceedings of 26th International Conference on Very Large Databases (VLDB); Sep. 2000.

Cockburn, A. et al.; "Issues of Page Representation and Organisation in Web Browser's Revisitation Tools"; Australian Journal of Information Systems; 2000.

Cockburn, A. et al.; "What Do Web Users Do? An Empirical Analysis of Web Use"; Int. J. Human-Computer Studies; vol. 54, No. 6; Jun. 2001; pp. 903-922.

Douglis, F. et al.; "Rate of Change and other Metrics: a Live Study of the World Wide Web"; USENIX Symposium on Internet Technologies and Systems; Dec. 1997; Monterey, California.

Fetterly, D. et al.; "A Large-Scale Study of the Evolution of Web Pages"; Softw. Pract. Exper. 2003; vol. 1, No. 1.

Friedman, J. et al.; "Additive Logistic Regression: A Statistical View of Boosting"; Ann. Statist.; vol. 28, No. 2; 2000; pp. 337-407.

Grandi, F.; "Introducing an Annotated Bibliography on Temporal and Evolution Aspects in the World Wide Web"; ACM SIGMOD Record; vol. 33, No. 2; Jun. 2004; New York.

Greenberg, S. et al.; "Getting Back to Back: Alternate Behaviors for a Web Browser's Back Button"; Proceedings of the 5th Annual Human Factors and the Web Conference; Held at NIST; Jun. 3, 1999; Gaithersburg, MD.

Herder, E.; "Characterizations of User Web Revisit Behavior"; Workshop on Adaptivity and User Modeling in Interactive Systems ABIS05; LWA 2005; pp. 32-37.

Jones, W. et al.; "Once Found, What Then?: A Study of 'Keeping' Behaviors in the Personal Use of Web Information"; Proceedings of the Annual Conference of American Society for Information Science and Technology (ASIST); 2002; Philadelphia, PA; pp. 391-402.

Kaasten, S. et al.; "Designing an Integrated Bookmark/History System for Web Browsing"; Proceedings of the Western Computer Graphics Symposium; Mar. 26-29, 2000; Panorama Mountain Village, BC, Canada.

Kellar, M. et al.; "An Exploration of Web-based Monitoring: Implications for Design"; CHI 2007 Proceedings, Empirical Studies of Web Interaction; Apr. 28-May 3, 2007; San Jose, Currently Amended.

Kellar, M. et al.; "A Goal-based Classification of Web Information Tasks"; Proceedings of the American Society for Information Science and Technology; Nov. 3-8, 2006; Austin, TX.

Kim, S.J. et al.; "An Empirical Study on the Change of Web Pages"; APWeb 2005; pp. 632-642.

Koehler, W.; "Web Page Change and Persistence: A Four-Year Longitudinal Study"; Journal of the American Society for Information Science and Technology; vol. 53, No. 2; Jan. 15, 2002; John Wiley & Sons; New York, NY; pp. 162-171.

Kwon, S.Y. et al.; "Effective Criteria for Web Page Changes"; APWeb 2006; pp. 837-842.

McKenzie et al.; "An Empirical Analysis of Web Page Revisitation"; 2001; 9 pages.

Milic-Frayling, N. et al.; "SmartBack: Supporting Users in Back Navigation"; Proceedings of the 13th International Conference on World Wide Web; 2004; ACM New York, NY; pp. 63-71.

Morrison, J.B. et al.; "A Taxonomic Analysis of What World Wide Web Activities Significantly Impact People's Decisions and Actions"; CHI'01; Mar. 31-Apr. 5, 2001.

Ntoulas, A. et al.; "What's New on the Web? The Evolution of the Web from a Search Engine Perspective"; Proceedings of the 13th International Conference on World Wide Web; May 18, 2004; ACM New York, NY.

Obendorf, H. et al.; "Web Page Revisitation Revisited: Implications of a Longterm Click-stream Study of Browser Usage"; CHI 2007 Proceedings, Web Usability; Apr. 28-May 3, 2007; San Jose, CA; pp. 597-606.

Pitkow, J. et al.; "Life, Death, and Lawfulness on the Electronic Frontier"; CHI 97 Electronic Publications; Mar. 22-27, 1997; Atlanta, GA.

Sebastiani, F.; "Machine Learning in Automated Text Categorization"; Journal ACM Computing Surveys (CSUR); vol. 34, No. 1; Mar. 2002; New York, NY; pp. 1-47.

Selberg, E. et al.; "On the Instability of Web Search Engines"; RIAO '00; Content-Based Multimedia Access; Apr. 2000; pp. 223-236.

Sellen, A.J. et al.; "How Knowledge Workers Use the Web"; CHI'02; Proceedings of the SIGCHI Conference on Human Factors in Computing Systems; Apr. 20-25, 2002; Minneapolis, MN.

Tabard et al.; "PageLinker: Integrating Contextual Bookmarks within a Browser"; CHI Proceedings 2007; Apr. 28-May 3, 2007; pp. 337-346.

Takano, H. et al.; "Dynamic Bookmarks for the WWW"; Hypertext 1998; ACM; New York, NY; pp. 297-298.

Tauscher, L. et al.; "How people revisit web pages: empirical findings and implications for the design of history systems"; Int. J. Human-Computer Studies; vol. 47; 1997; pp. 97-137.

Tauscher, et al.; "Revisitation Patterns in World Wide Web Navigation"; 1997; 14 pages.

Teevan, J. et al.; "Information Re-Retrieval: Repeat Queries in Yahoo's Logs"; SIGIR '07; Amsterdam, The Netherlands; Jul. 2007.

White, R. et al.; "Investigating Behavioral Variability in Web Search"; WWW'07 Proceedings of the 16th International Conference on World Wide Web; Apr. 7, 2007; pp. 21-30.

\* cited by examiner

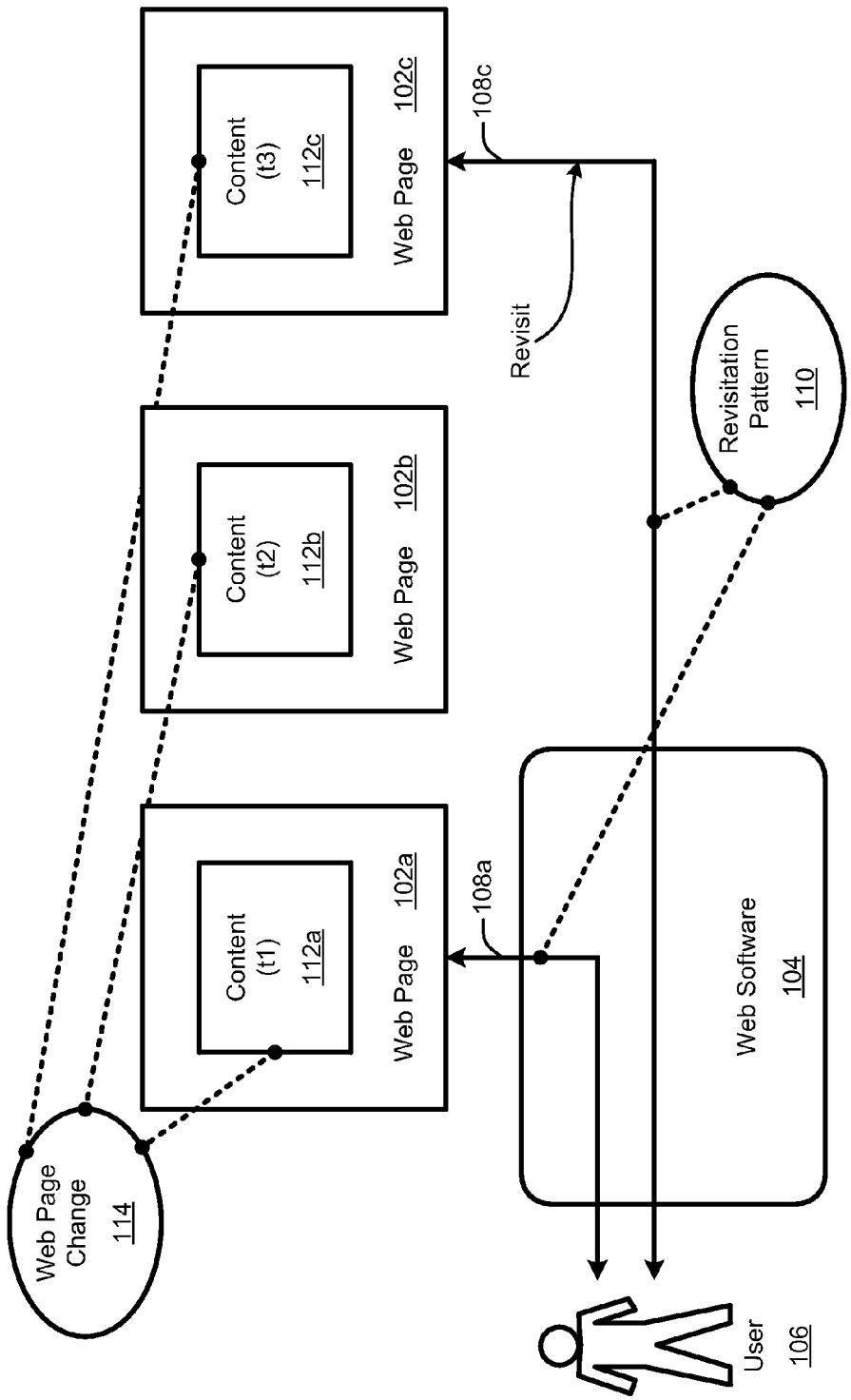

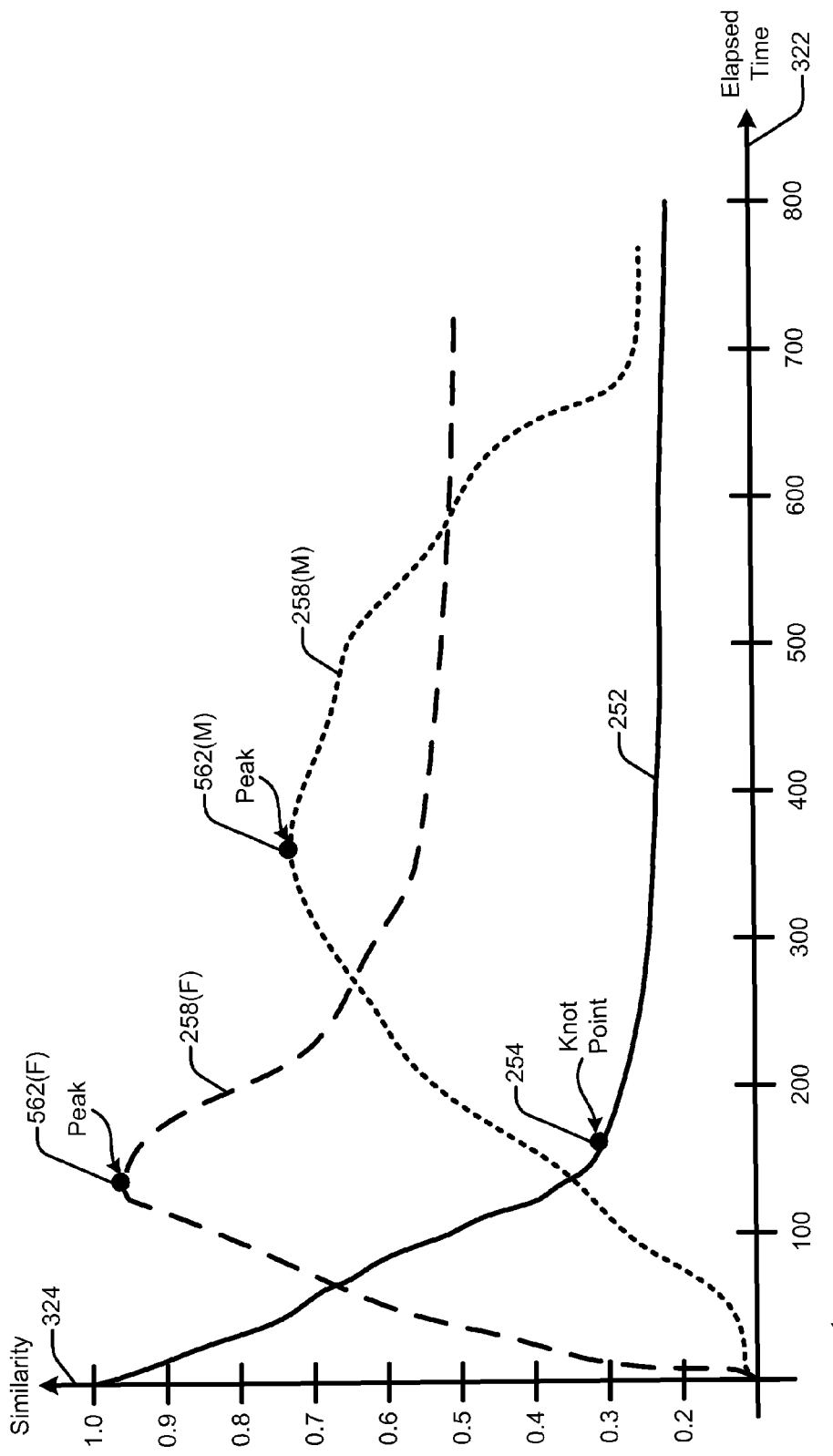

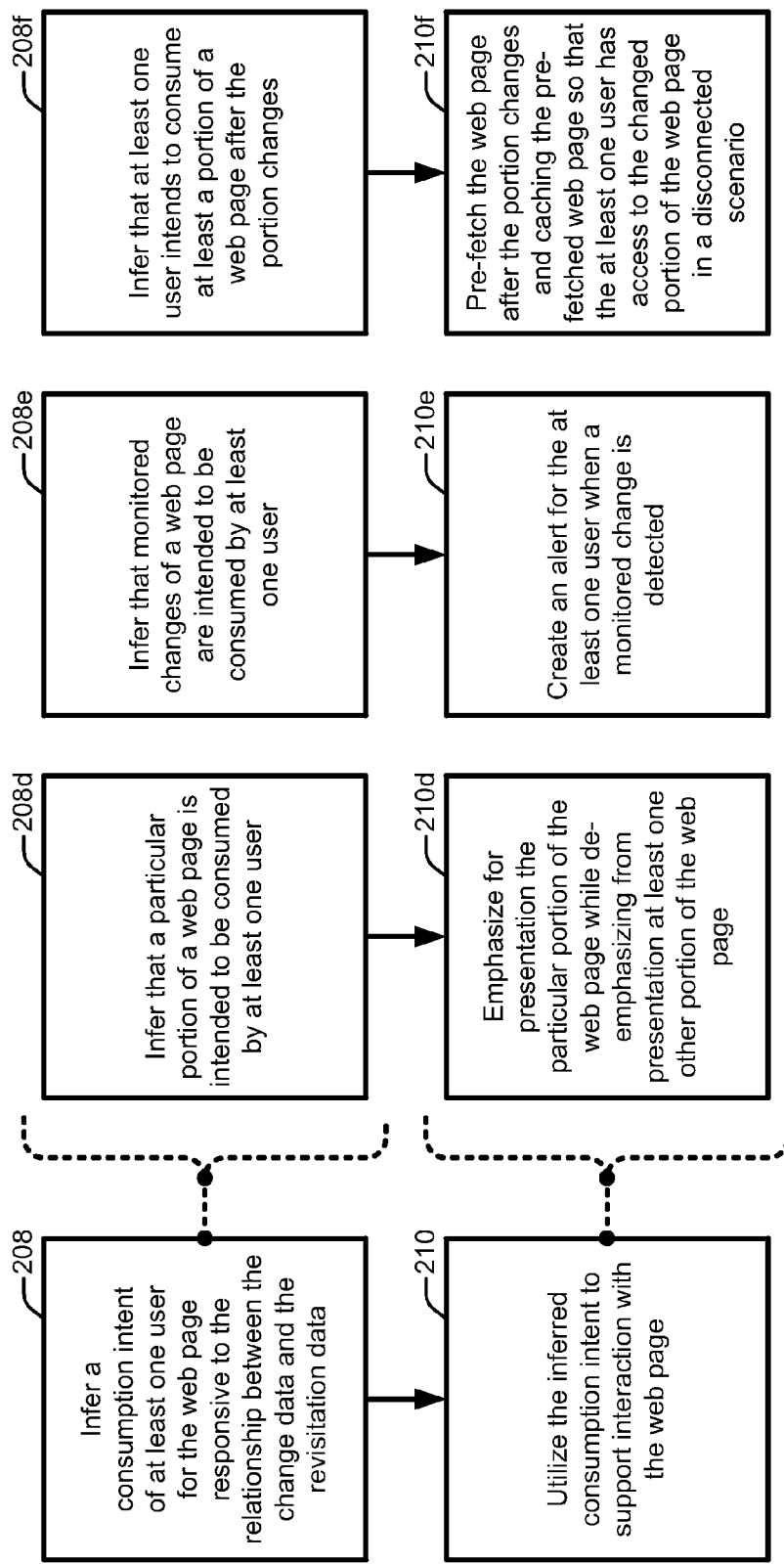

RELATING WEB PAGE CHANGE WITH REVISITATION PATTERNS

CROSS-REFERENCE TO RELATED APPLICATIONS

This patent application is a continuation of, and claims priority from, U.S. patent application Ser. No. 12/163,149, filed on Jun. 27, 2008, which is incorporated herein by reference in its entirety.

BACKGROUND

The internet offers a wealth of information that is typically divided into web pages. A web page is a unit of information that is accessible via the internet. Each web page may be available in any one or more of a number of different formats. Example formats include HyperText Markup Language (HTML), Portable Document Format (PDF), and so forth. Each web page may include or otherwise provide access to other types of information in addition to text, such as audio, video, or interactive content.

Web pages include information covering news, hobbies, philosophy, technical matters, entertainment, travel, world cultures, and many other topics. The extent of the information available via the internet provides an opportunity to access many different topics. In fact, the number of web pages and the amount of information that are available over the internet is increasing daily. Much of this information is also updated or otherwise modified on a frequent basis. Unfortunately, the size, scope, and constant alterations of the content offered by the internet can make it difficult to access desired information from among the many multitudes of web pages.

SUMMARY

Web page change may be related to revisitation patterns to support web interaction by a user. In an example embodiment, a method involves analyzing change data and revisitation data for a web page, determining a relationship between the change and revisitation data, inferring consumption intent by a user for the web page responsive to the relationship, and utilizing the inferred consumption intent.

In another example embodiment, change data is analyzed to produce a change characterization, with the change data reflecting differences between content of a web page at different times. Revisitation data is analyzed to produce a revisitation characterization, with the revisitation data including visit times for visits to the web page by a user. A relationship is determined between the change data and the revisitation data based on the change characterization and the revisitation characterization. Consumption intent of the user for the content of the web page is inferred responsive to the relationship between the change data and the revisitation data. The inferred consumption intent is then utilized to support interaction with the web page.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other systems, methods, devices, media, apparatuses, arrangements, and other example embodiments are described herein.

BRIEF DESCRIPTION OF THE DRAWINGS

The same numbers are used throughout the drawings to reference like and/or corresponding aspects, features, and components.

FIG. 1A is a block diagram of an example environment that illustrates web page change and revisitation patterns along with web software.

FIG. 5F depicts a graph illustrating an example relationship between a change curve and two different revisitation curves.

FIG. 6C is a block diagram including flow diagram portions that illustrate additional example implementations for inferring and utilizing a consumption intent.

DETAILED DESCRIPTION

Figure 1B:
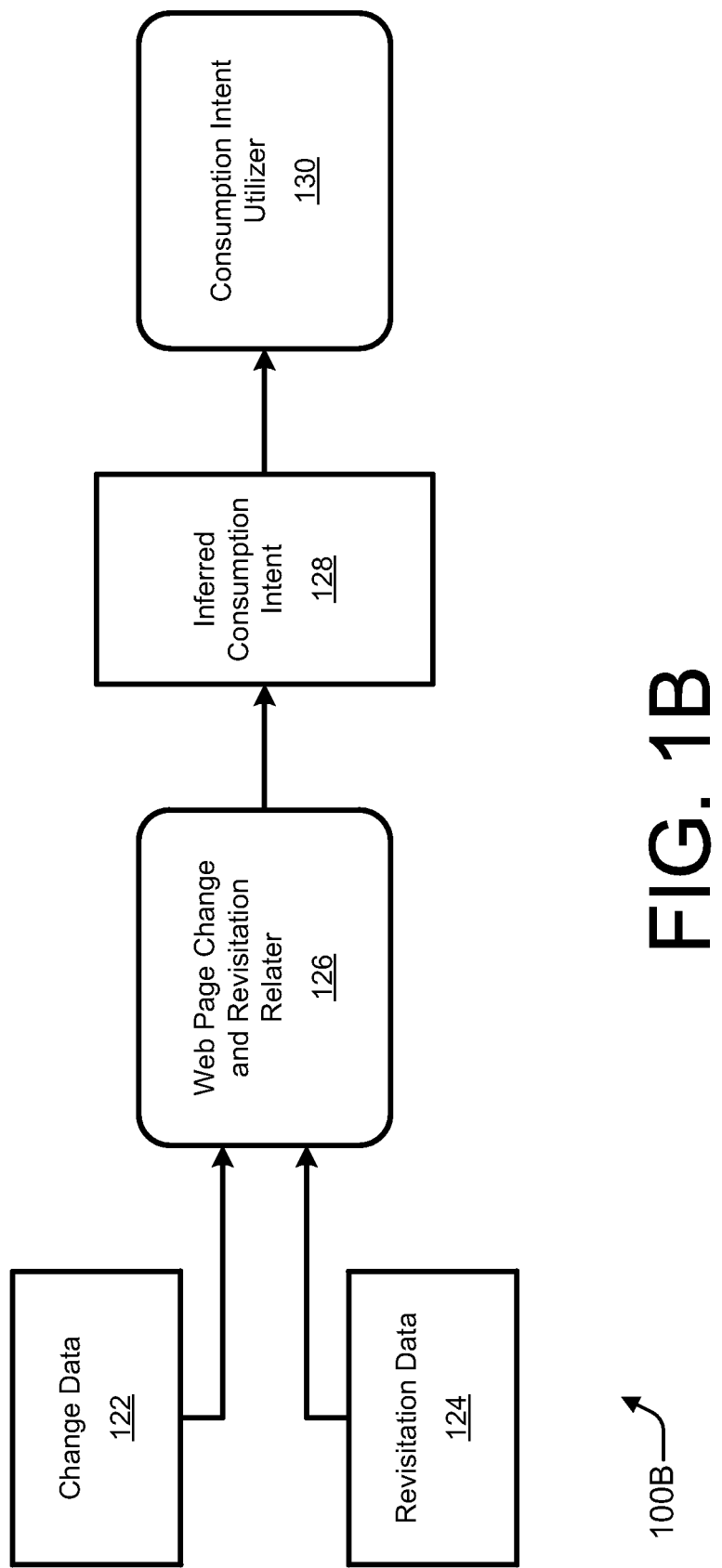
FIG. 1B is a block diagram of an example approach to relating web page change with revisitation patterns.

1: Introduction to Relating Web Page with Revisiting Patterns

As explained above, the size, scope, and constant alterations of the content offered by the internet can make it difficult to access desired information from among the many multitudes of web pages. The internet is indeed a dynamic, ever changing collection of information. There is, however, a relationship between changes to web page content and people's revisitation to those web pages. Changes to web page content may be compared and otherwise related to revisitation patterns to better understand the relationship between the content changes and the revisitation patterns. For example, investigation has revealed that web pages that are visited frequently or that are revisited after short time intervals are likely to change more quickly than other web pages. Moreover, relationships between web page changes and web page revisitation patterns may be used to infer how a user intends to consume the content of a web page. This inferred user consumption intent may be utilized to support interaction with the web page by web browsers, search engines, web crawlers, and so forth.

Revisiting web pages is common, but people's reasons for revisiting can be diverse. For example, a person may return to a conference website to be reminded of the conference location or to catch up on the latest news. Changes to the content of a web page can, when related to revisitation patterns, give clues to the user's intent (e.g., interests, information goals, etc.) when returning. For example, a person who returns at a frequency similar to the frequency with which the conference website is updated may be interested in catching up with the latest news while a person who returns after a longer interval may be more likely to be interested in revisiting the web page's static content. In the context of web page visits and consumption intent, a user may be a person, an application, an application that is fully or partially under the control of a person, some combination thereof, and so forth.

Although content changes to web sites can be beneficial to a user looking for new information, such changes can also interfere with the re-finding of previously viewed content. If a system can understand what content a user is interested in when revisiting a web page, such a system can attempt to satisfy those interests. For example, the system can highlight changed content when the change is considered interesting to the user, can actively monitor content changes of particular interest to the user, can provide cached information when changes might interfere with re-finding old information, and so forth. In the description herein below, example approaches to relating the resonance, or associations, between web page content change and web page revisitation patterns are addressed. Example embodiments for using these relationships are also described.

Investigation of web page change and revisitation patterns has revealed a number of trends. For example, investigations indicate that people are more likely to be interested in finding or monitoring new information in pages that change relatively rapidly, but they are more likely to be interested in re-finding previously viewed information in pages that change relatively less frequently. Recognition and application of such trends can enable web interaction to be supported. Seven examples are briefly described below.

First, one application of the relationship between revisitation and change is the use of revisitation frequencies to identify portion(s) of a web page that are likely to be of interest to a user. For instance, there may be a web page portion where revisitation resonates with changes to the portion. (It should be understood that the term "resonate" as used herein is not limited to a strict mathematical interpretation, for it also embraces similarities in rate or frequency, correlations, and so forth.) Second, rapidly-changing content may be extracted for mobile browser users who might want ready access to the news page while static information is excluded to save bandwidth and screen real estate. For instance, by recognizing the revisitation patterns of a user, a mobile browser can filter content to display dynamic content that has changed (instead of rendering the stable content), which can be helpful due to a mobile device's likely smaller display screen. Third, when a search engine or other application is to extract a snippet or web page summary to present it to a user, the extraction can be made more relevant by knowing the user's likely information goal as defined by their revisitation patterns. For instance, for a user searching for a website in which it is believed that the primary interest is in static content, that static content can be returned as the result snippet (e.g., over an equally likely snippet selected from dynamic content.)

Fourth, a monitoring system can be aware of which changes a user is interested in and actively notify the user of changes without necessitating a revisit to a web page. Fifth, internet system designers can make use of the information side-effect of revisitation habits of many users in order to optimize their systems. Sixth, web crawlers can utilize the relationship between change and revisitation to adaptively retrieve content at a rate that is not likely to miss important changes to web pages, but likewise does not overwhelm websites. Seventh, a search engine can match the frequency of occurrence of a query with appropriately-changing web pages. For instance, for queries whose frequency is constant over time, a preference may be given to static pages. These and other example embodiments for supporting web interaction are described further herein.

Generally, relating web page change with revisitation patterns can be used to support web interaction. As is described herein below for certain example embodiments, change data can be analyzed to produce change characterizations. Revisitation data can be analyzed to produce change characterizations. One or more relationships may be determined between the change data and the revisitation data based on the change characterizations and the revisitation characterizations. User consumption intent may be inferred responsive to the determined relationship. Interaction with the web may then be supported utilizing the inferred consumption intent.

An environment and general concepts for example embodiments of relating web page change with revisitation patterns are described in this Introduction Section 1 with reference to FIGS. 1A-1B. General methods and schemes are described in Section 2 with reference to FIGS. 2A-2C. The description of FIGS. 3A-3B in Section 3 is directed to change curves, which are an example of change characterizations. The description of FIGS. 4A-4E in Section 4 is directed to revisitation curves, which are an example of revisitation characterizations. Example embodiments for determining relationships and inferring consumption intents are described in Section 5 with reference to FIGS. 5A-5G. Aspects of inferring consumption intents and utilizing them to support web interaction are described for example implementations in Section 6 with reference to FIGS. 6A-6C.

FIG. 1A is a block diagram of an example environment 100A that illustrates web page change 114 and revisitation patterns 110 along with web software 104. As illustrated, environment 100A includes multiple web pages 102, web software 104, a user 106, and web page content 112. Environment 100A also involves visits/revisits 108 to web pages, revisitation pattern 110, and web page change 114. As specifically shown, there are three different versions of web page 102: web page 102a, web page 102b, and web page 102c. Respective versions of web page 102a,b,c correspond to content 112a,b,c at respective times t1,t2,t3.

In an example embodiment, web page 102a has content 112a at time t1. Web page 102b has content 112b at time t2. Web page 102c has content 112c at time t3. Content 112 may be different at any given time as compared to the content at a different time. These differences in content 112 for web page 102 are denoted generally as and represented by web page change 114. These differences may be monitored, tracked, reported, and so forth. Web page change (or change pattern) 114 may pertain to content 112 at any number of different times and/or to any number of web pages 102. Moreover, web page change 114 (e.g., of content 112) may pertain to any portion of the web page content up to and including all of the content. Example web page portions include, but are not limited to, navigational information, a pane, a section, a paragraph, an advertisement, a block, a word, tags, other metadata, combinations thereof, and so forth.

Over some period of time, user 106 may repeatedly visit web page 102. Generally, user 106 employs web software 104 to visit 108 web page 102. User 106 may be a person, an application (including web software 104), a combination of both, and so forth. As specifically shown, web software 104 is used to visit 108a web page 102a to access content 112a at time t1. Web software 104 is used to visit 108c web page 102c to access content 112c at time t3. Second and subsequent visits 108 may be considered revisits as indicated in environment 100A. These visits 108a and 108c are denoted generally as and represented by revisitation pattern 110. Revisitation patterns 110 may pertain to any number of visits 108 and/or to any number of web pages 102.

As described further herein, web software 104 may support web interaction (e.g., by user 106 with web page 102) by relating web page change 114 with revisitation pattern 110. Generally, web software 104 facilitates access by user 106 to at least one web page 102. Thus, web software 104 may directly or indirectly enable user 106 to access a web page 102. Examples of web software 104 that directly facilitate access to web pages 102 are traditional web browsers, news readers, web servers/sites, and so forth. Examples of web software 104 that indirectly facilitate access to web pages 102 are web search engines, web crawlers, and so forth.

However, web software 104 may be of a different type, including some combination of those explicitly identified herein. Furthermore, two or more different types of web software 104 may be employed during a single web page access (e.g., a web browser retrieving content 112 of web page 102 via a web site). It should also be noted that a web crawler may be included as part of a search engine. Web software 104 may realized as software, firmware, hardware, fixed logic circuitry, some combination thereof, and so forth.

FIG. 1B is a block diagram of an example approach 100B to relating web page change with revisitation patterns. As illustrated, approach 100B includes change data 122, revisitation data 124, a web page change and revisitation relater 126, an inferred consumption intent 128, and a consumption intent utilizer 130. Web page change and revisitation relater 126 and/or consumption intent utilizer 130 may be part of web software 104 (of FIG. 1A).

In an example embodiment, change data 122 and revisitation data 124 are collected by web software or an affiliated entity. Generally, with reference also to FIG. 1A, change data 122 reflects one or more differences between content 112 of a web page 102 at different times t1-t3. Revisitation data 124 includes one or more visit times for visits 108 by at least one user 106 to the web page 102. Change data 122 for a given web page 102 may be directed to change patterns 114 of the entirety of the web page, portions of the web page, or both. Revisitation data 124 for a given web page 102 may reflect revisitation patterns 110 for one user, multiple users, or both. Change data 122 and revisitation data 124 are described further herein below with particular reference to FIG. 2C.

In an example operation of approach 100B, change data 122 and revisitation data 124 are input to web page change and revisitation relater 126. Web page change and revisitation relater 126 determines at least one relationship between change data 122 and revisitation data 124 and outputs inferred consumption intent 128 in response to the relationship. Inferred consumption intent 128 represents a likely intent of one or more users 106 (e.g., one or more persons, applications, etc.) with regard to how content 112 of web page 102 is expected and/or desired to be consumed. Inferred consumption intent 128 may be, by way of example but not limitation, an intent to consume dynamic content or an intent to consume static content of a web page. If dynamic content is intended, inferred consumption intent 128 may further be, for instance, an intent to consume new content, old content, monitored changes to the content, and so forth. Inferred consumption intent 128 is input to consumption intent utilizer 130, which utilizes the inferred consumption intent to support interaction by user 106 with web page 102.

Figure 2A:
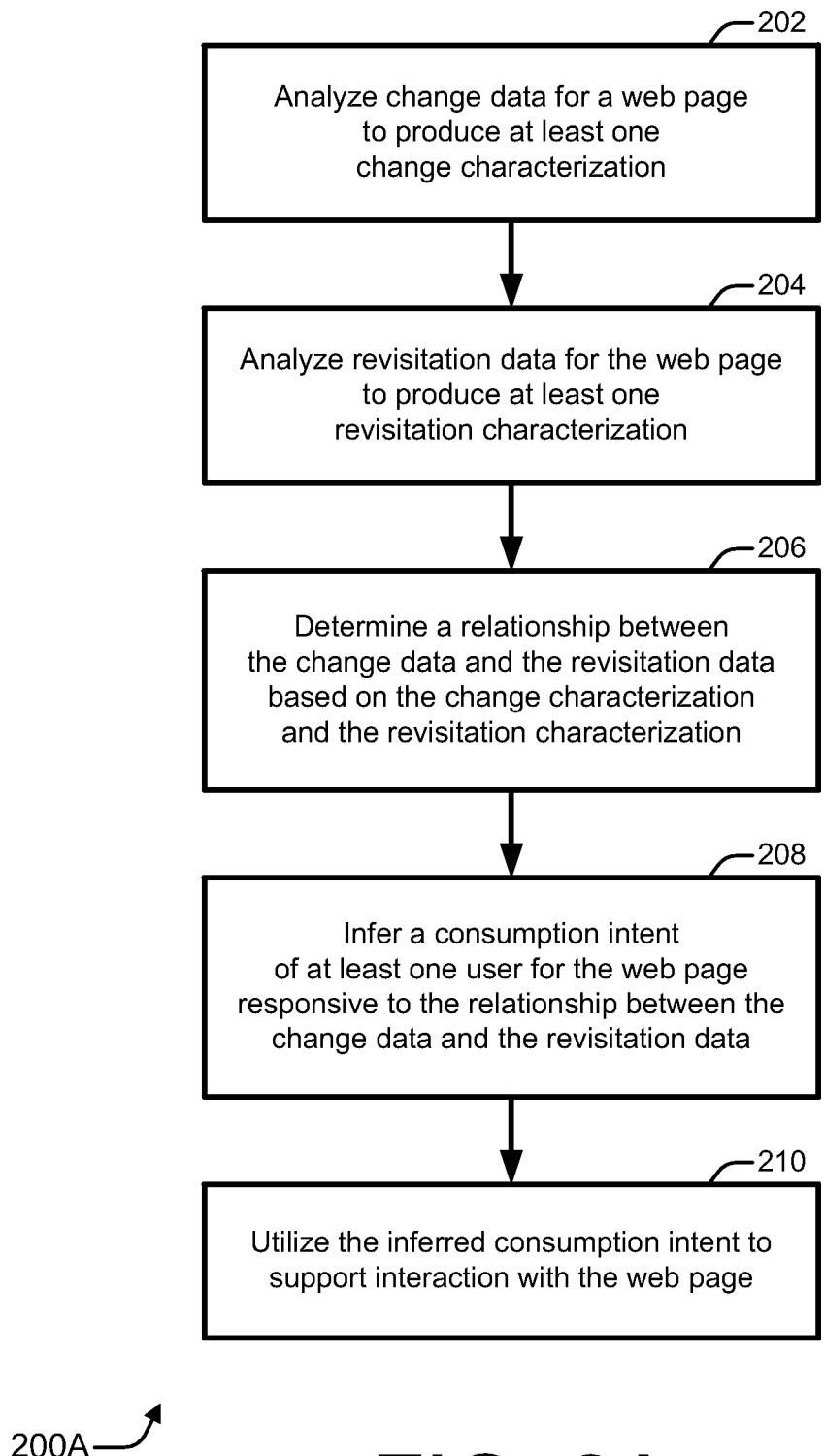
FIG. 2A is a flow diagram that illustrates an example of a general method for relating web page change with revisitation patterns.

2: Example General Embodiments for Relating Web Page Change with Revisiting Patterns FIG. 2A is a flow diagram 200A that illustrates an example of a general method for relating web page change with revisitation patterns. Flow diagram 200A includes five blocks 202-210. Implementations of flow diagram 200A may be realized, for example, as processor-executable instructions and/or as part of web software 104 (of FIG. 1A), including at least partially by a web page change and revisitation relater 126 and/or a consumption intent utilizer 130 (both of FIG. 1B). Example embodiments for implementing flow diagram 200A are described below in conjunction with the description of FIG. 2B.

Figure 7:
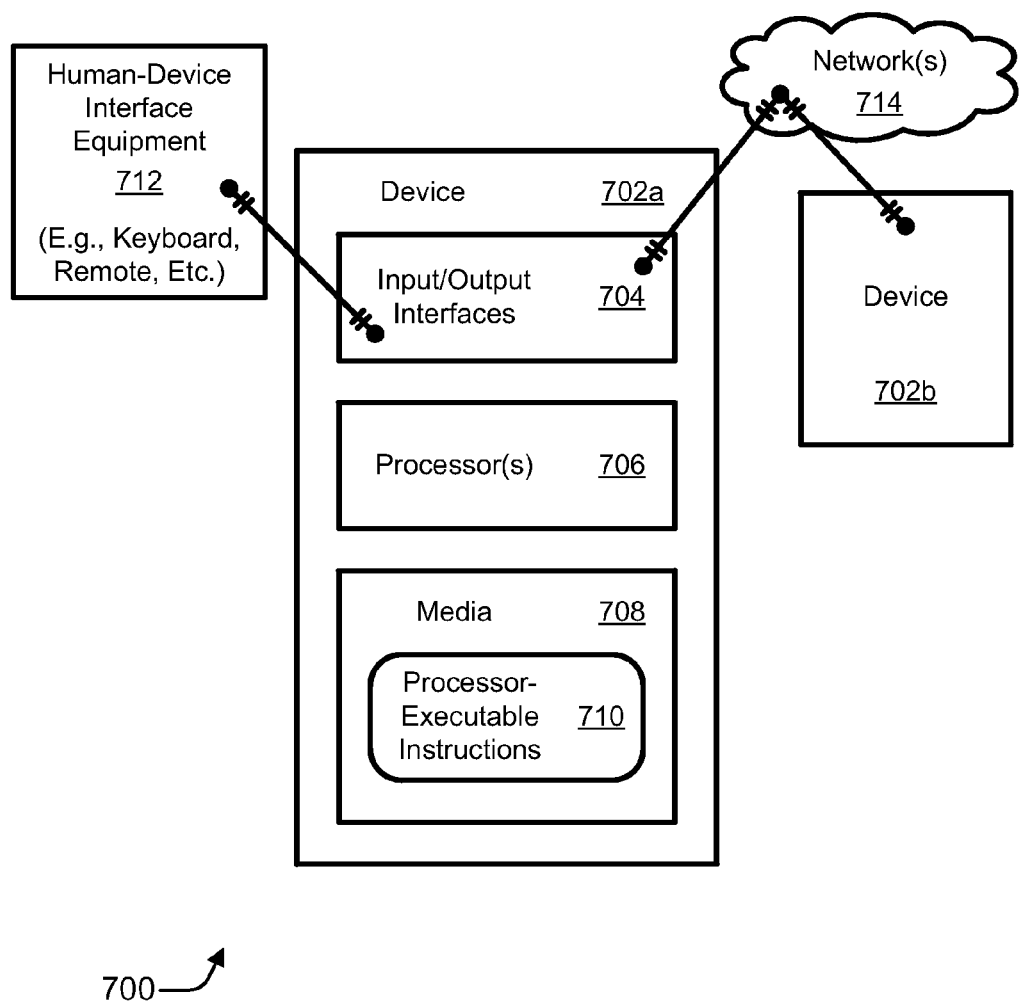
FIG. 7 is a block diagram of example devices that may be used to implement embodiments for relating web page change with revisitation patterns.

The acts of the various flow diagrams that are described herein may be performed in many different environments and with a variety of different devices, such as by one or more processing devices (of FIG. 7). The orders in which the methods are described are not intended to be construed as a limitation, and any number of the described blocks can be combined, augmented, rearranged, and/or omitted to implement a respective method, or an alternative method that is equivalent thereto. Although specific elements of certain other FIGS. are referenced in the description of the flow diagrams, the methods may be performed with alternative elements.

Figure 2B:
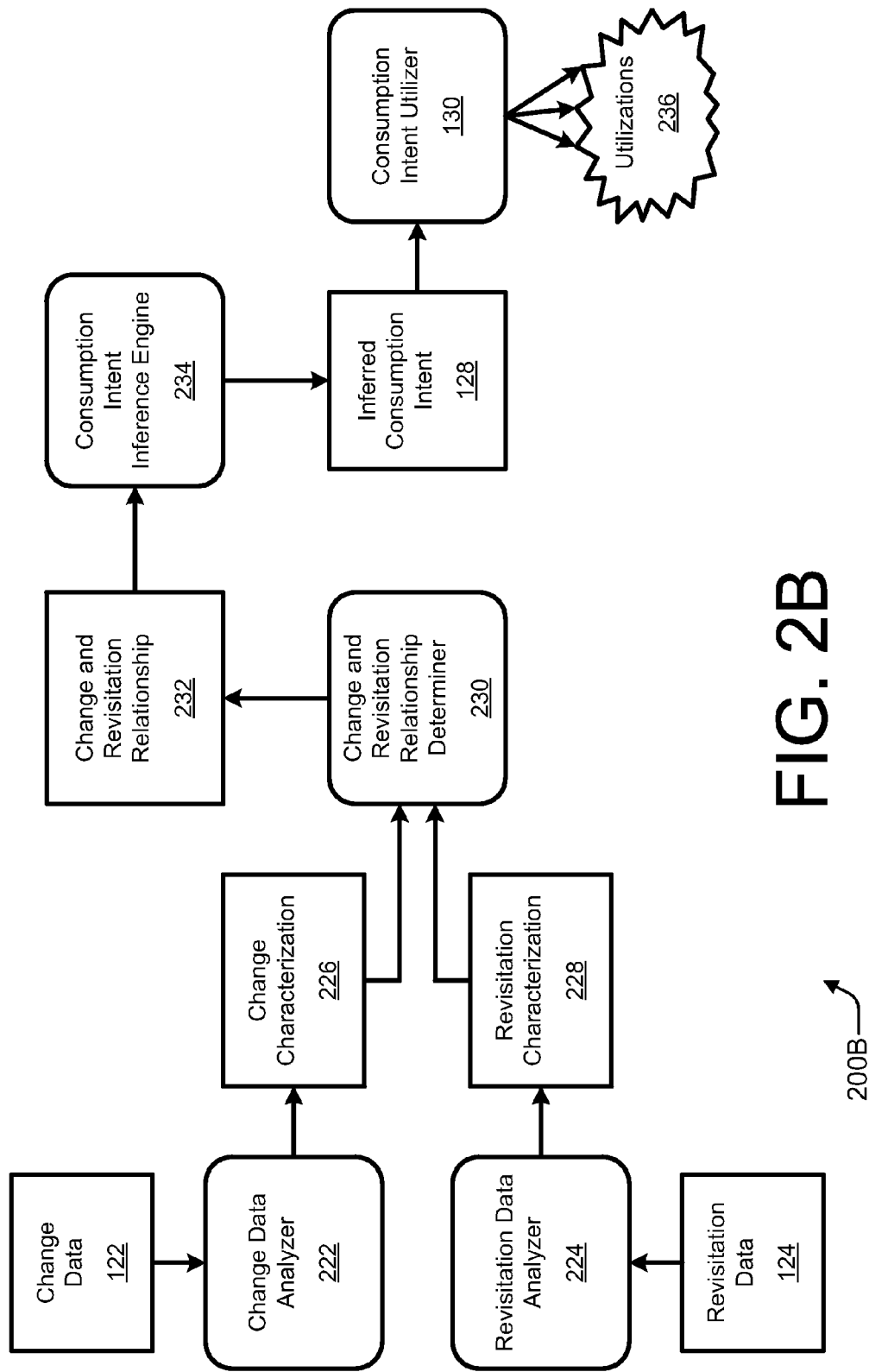
FIG. 2B is a block diagram that illustrates an example scheme for web software that relates web page change with revisitation patterns.

FIG. 2B is a block diagram that illustrates an example scheme 200B for web software that relates web page change with revisitation patterns. As illustrated, scheme 200B includes change data 122, a change data analyzer 222, at least one change characterization 226, revisitation data 124, a revisitation data analyzer 224, and at least one revisitation characterization 228. Scheme 200B further includes a change and revisitation relationship determiner 230, a change and revisitation relationship 232, a consumption intent inference engine 234, inferred consumption intent 128, consumption intent utilizer 130, and one or more utilizations 236.

An implementation of web page change and revisitation relater 126 (of FIG. 1B) may include, for example, change data analyzer 222, revisitation data analyzer 224, change and revisitation relationship determiner 230, and consumption intent inference engine 234. A given implementation for web software 104 (of FIG. 1A) may include any of the components illustrated in FIG. 2B. Flow diagram 200A of FIG. 2A and scheme 200B of FIG. 2B are jointly described below.

In an example embodiment, at block 202, change data for a web page is analyzed to produce at least one change characterization. The change data may reflect one or more differences between content of a web page at different times. For example, change data 122 for a web page 102 is input to change data analyzer 222. Change data analyzer 222 performs an analysis to produce at least one change characterization 226. Change data 122 reflects one or more differences between content 112 of web page 102 at different times t1, t2, t3.... The description of FIGS. 3A-3B in Section 3 is directed to change curves, which are an example of change characterizations 226.

At block 204, revisitation data for the web page is analyzed to produce at least one revisitation characterization. The revisitation data may include one or more visit times for visits by at least one user to the web page. For example, revisitation data 124 for web page 102 is input to revisitation data analyzer 224. Revisitation data analyzer 224 performs an analysis to produce at least one revisitation characterization 228. Revisitation data 124 includes one or more visit times t1, t3, . . . for visits 108 by user 106 to web page 102. The description of FIGS. 4A-4E in Section 4 is directed to revisitation curves, which are an example of revisitation characterizations 228.

At block 206, a relationship between the change data and the revisitation data is determined based on the change characterization and the revisitation characterization. For example, change characterization 226 and revisitation characterization 228 are input to change and revisitation relationship determiner 230. Change and revisitation relationship determiner 230 performs a relation determination based on change characterization 226 and revisitation characterization 228 to determine change and revisitation relationship 232. Change and revisitation relationship 232 represents one or more relationships, each of which may incorporate any number of factors, between change data 122 and revisitation data 124. For an example quantitative embodiment, a determined change and revisitation relationship 232 may correspond to a determined correlation between change characterization 226 and revisitation characterization 228.

At block 208, a consumption intent of at least one user is inferred for the web page responsive to the relationship between the change data and the revisitation data. For example, change and revisitation relationship 232 is input to consumption intent inference engine 234. Responsive to change and revisitation relationship 232, consumption intent inference engine 234 outputs inferred consumption intent 128. Generally, inference of a consumption intent may be based, at least in part, on whether or not a change characterization 226 and a revisitation characterization 228 comport with at least one predetermined criterion (e.g., in the context of a change and revisitation relationship 232). Example embodiments for determining relationships and inferring consumption intents are described below in Section 5 with particular reference to FIGS. 5A-5G.

At block 210, the inferred consumption intent is utilized to support interaction with the web page. For example, inferred consumption intent 128 is provided to consumption intent utilizer 130. Consumption intent utilizer 130 effectuates one or more utilizations 236 of inferred consumption intent 128 to support interaction with web page 102. Aspects of inferring consumption intents and utilizing them to support web interaction are described for example embodiments in Section 6 below with particular reference to FIGS. 6A-6C. An inferred consumption intent 128 may be targeted for a local level (e.g., to an individual) or for a global level (e.g., to an aggregated group). For example, if revisitation data 124 (and thus revisitation characterization 228) covers a group of users, change and revisitation relationship 232 (and thus inferred consumption intent 128) may be relevant to the group. Web pages may also be grouped for change data purposes.

Figure 2C:
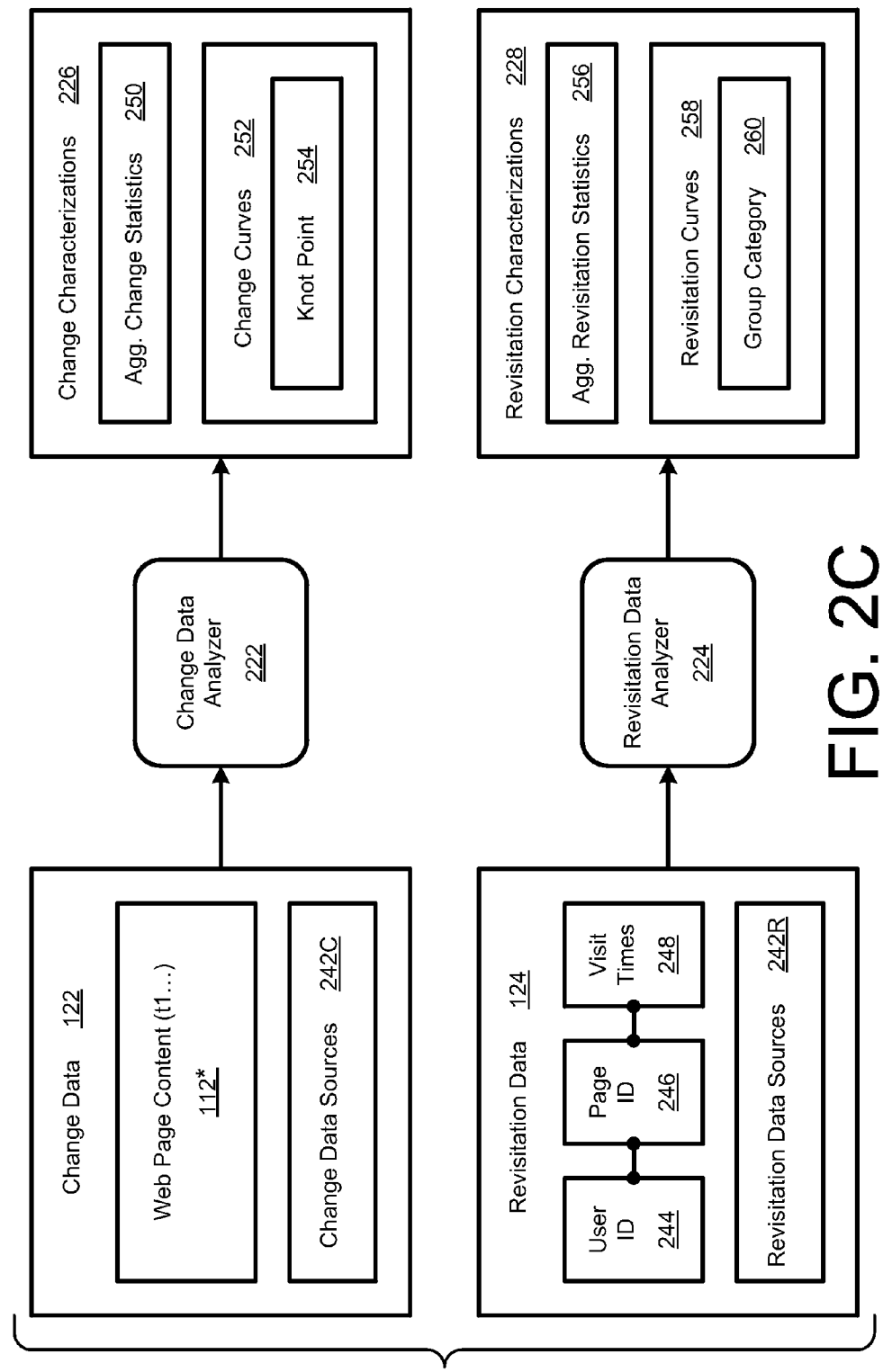
FIG. 2C is a block diagram that illustrates example operations for web software that involve analyzing change data and revisitation data to produce change characterizations and revisitation characterizations, respectively.

FIG. 2C is a block diagram that illustrates example operations for web software that involve analyzing change data 122 and revisitation data 124 to produce change characterizations 226 and revisitation characterizations 228, respectively. Change data 122 is input to change data analyzer 222. Change data analyzer 222 performs an analysis to produce one or more change characterizations 226. Revisitation data 124 is input to revisitation data analyzer 224. Revisitation data analyzer 224 performs an analysis to produce one or more revisitation characterizations 228. Change data 122 and revisitation data 124 are collected from one or more data sources 242.

As illustrated, change data 122 includes web page content (t1, t2, t3, . . . ) 112* that originates or is collected from one or more of change data sources 242C. Revisitation data 124 includes data directed toward user identification (ID) 244, page identification 246, and visitation times 248. Revisitation data 124 originate or are collected from one or more of revisitation data sources 242R.

As illustrated, change characterizations 226 include aggregate change statistics 250 and/or change curves 252. Each change curve 252 may be at least partially represented by its corresponding knot point(s) 254. Revisitation characterizations 228 include aggregate revisitation statistics 256 and/or revisitation curves 258. Each revisitation curve 258 may be at least partially represented by its corresponding group category 260. Thus, there are change characterizations 226 and revisitation characterizations 228 generally. An example of each type of characterization is a curve. For change curves 252, individual ones may be represented by a knot point 254. For revisitation curves 258, individual ones may be represented by a maximum revisitation frequency. For change curves 252, groups of them may be represented by change group type (e.g., knotted, flat, sloped, etc.). For revisitation curves 258, groups of them may be represented by group category 260.

In an example embodiment, with respect to change data 122, web page content 112* may comprise up to the full content 112 of web page 102 for each time index at which the content is monitored. Alternatively, web page content 112* may comprise content 112 of web page 102 for each time at which the content is monitored by retaining the differences between different versions. Other mechanisms for collecting web page content 112* may also be employed.

With respect to revisitation data 124, each user identification 244 identifies a user 106 (of FIG. 1A) or at least a machine being used by one or more users 106. As noted above, a user 106 may be a person, an application, a combination thereof, and so forth. It may be linked to other identifying information or may be anonymized. Each page identification 246 identifies a web page 102; it may be, for instance, a Uniform Resource Locator (URL). Visit time(s) 248 are a set of timestamps indicating when a corresponding user has visited a corresponding web page. There may be one or more than one time included in visit times 248. Not only are repeated visits relevant for a revisitation analysis, but the absence of a second visit my also be relevant.

Change data sources 242C and revisitation data sources 242R may be similar or even the same sources. Example data sources 242 include web browsers or browser histories, web sites or their server logs, search engines or their indexes, web crawlers or their databases, web proxies or their logs, browser plug-ins (e.g., tool bars), anti-phishing filters, surveys, some combination thereof, and so forth. For example, a tool bar installed in a web browser may know and/or report a user identification 244, page identifications 246, and corresponding visitation times 248 of a user. Also, a web site may expose information regarding its own content changes and/or visits by users. A web crawler may collect web page content 112* during its crawls.

Thus, a browsing history may be acquired from a web browser of one user or multiple users. Server logs may be, for example, the log or logs of a web server, a proxy server, and so forth. A tool bar may be a stand-alone application tool or part of another application, such as a web browser (e.g., implemented as a browser plug-in). The tool bar acquires data on browsing visits and may forward them to a server for incorporation into a multi-user server log. Surveys are typically implemented at least partially manually; however, responses to surveys can provide insight into the actual intent of a user when revisiting a web page. Change data 122 and/or revisitation data 124 may alternatively be drawn from other data sources 242.

For change characterizations 226, aggregate change statistics 250 may include, by way of example, an amount of change, a rate of change or average frequency of change, some other summary metric, some combination thereof, and so forth. Rate of change may represent, for example, the average time between content changes. Content change may refer to any detectable change, to a predefined amount of change, and so forth.

Amount of change may be measured using any of many standard or specialized mechanisms. Example mechanisms include changes in bag of word frequencies, differences between blocks of text, combinations thereof, and so forth. One example mechanism involves measuring changes in web page textual content using Dice, Jaccard, cosine, probabilistic, etc. measures of the similarity between pages. The Dice, Jaccard, cosine or probabilistic measures may be calculated with the web page textual content represented as a bag of words (e.g., with HTML tags filtered) or with alternative feature representations. These mechanisms essentially measure the size normalized overlap between two vectors, which in this case represent the words of the web page content.

For certain example embodiments, each change curve 252 reflects the change pattern 114 of content 112 of a web page 102 over time in graphical or other mathematical form as produced from change data 122. Change curve 252 graphs elapsed time versus an amount of change to the content of the web page. With regular crawls, the frequency and amount of change for each web page of interest may be tracked. Each knot point 254 indicates a time when the amount of change to the content of a web page approximately ceases. Change curves 252 and knot points 254 are described further herein below with particular reference to FIGS. 3A-3B.

For revisitation characterizations 228, aggregate revisitation statistics 256 may include, by way of example, any of the following statistics with regard to a given web page: a total number of revisiting users, a rate of revisitation or average frequency of visits, an average inter-visit time, some other summary metric, a combination thereof, and so forth. The average revisitation frequency represents how many visits, on average, each user makes to a given web page over a predetermined interval. Average inter-visit time represents the average time between any two consecutive visits by each user to a given web page. Other summary metrics (for change and/or revisitation) represent any one or more of multiple standard statistical metrics for summarizing data, such as the mean, the median, the maximum and/or minimum, a Fourier transform, and so forth. The data of aggregate revisitation statistics 256 are aggregated over time for individuals to produce individualized local aggregate revisitation statistics and/or are aggregated over time across multiple users to produce global group aggregate revisitation statistics that are averaged over the multiple users.

For certain example embodiments, each revisitation curve 258 reflects the revisitation pattern of a given web page in a graphical or other mathematical form that is derived from a timestamp series of interactions with the given web page to represent how users revisit the web page. The revisitation curve can be representative of how one user revisits a given web page or how multiple users on average revisit the given web page. For comparison purposes, a revisitation curve 258 may be normalized. In an example implementation, revisitation curves 258 may be organized by group category 260 or by other curve characteristics (e.g., one or more peaks). Implementations relating to revisitation curves 258 and revisitation curve group categories 260 are described further herein below with particular reference to FIGS. 4A-4E.

3: Example Change Curve Implementations for Change Characterizations

Although the similarity between the content of two successive versions of a web page may be very high over a relatively short interval (e.g., about an hour), the similarity between one fixed version of the page and subsequent versions can decrease substantially over time. In other words, the average amount of change over time for a given web page tends to increase even though each successive incremental change may be relatively small. To quantify the change over time of web page content, a change curve as is described herein may be used. For example embodiments, a change curve represents the amount of textual change (e.g., as calculated by Dice, Jaccard, cosine or probabilistic measures) from a fixed point in a web page's history.

Figure 3A:
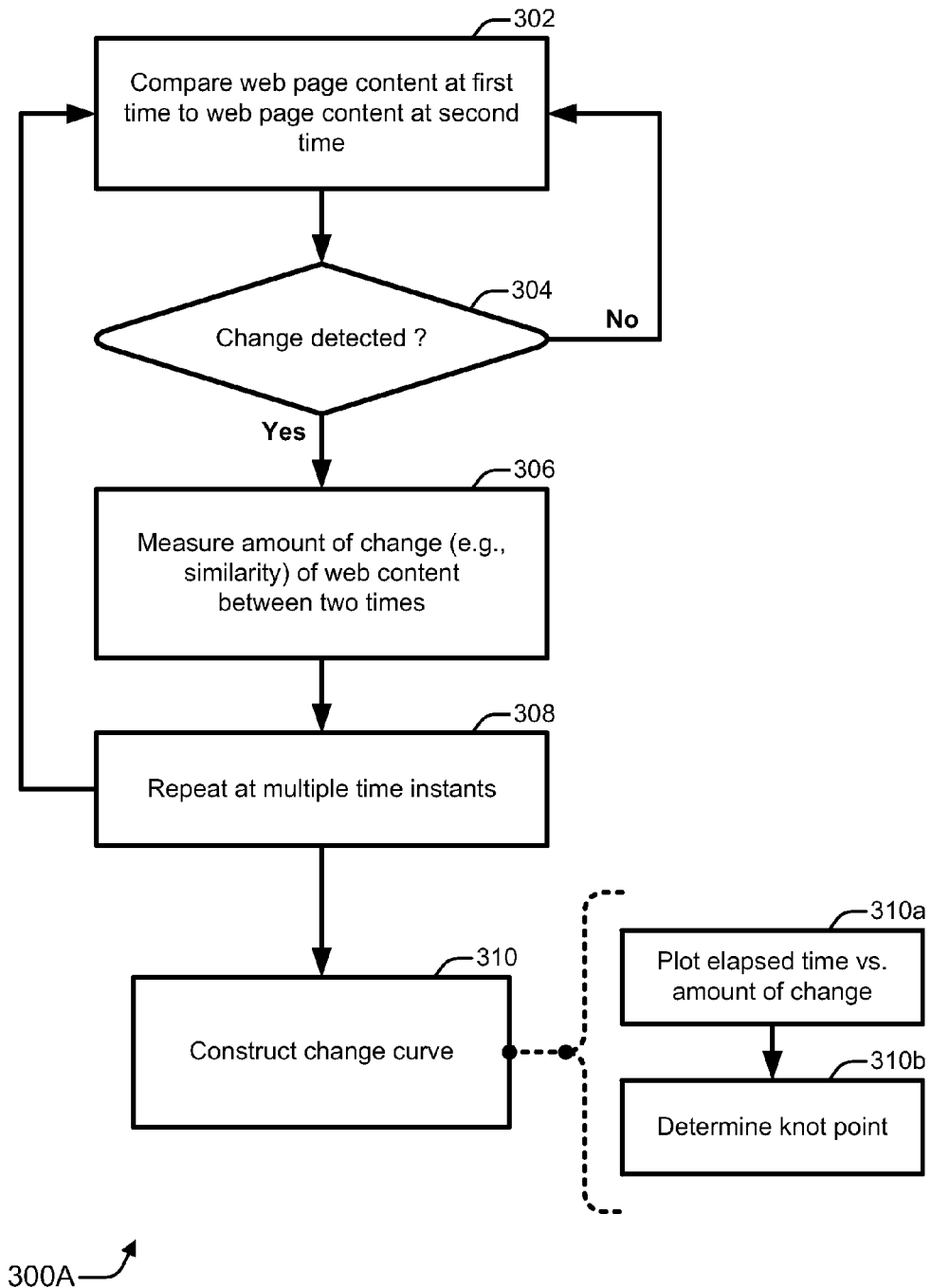
FIG. 3A is a flow diagram that illustrates an example of a method for monitoring changes to web page content and constructing a change curve based on the monitored changes.

FIG. 3A is a flow diagram 300A that illustrates an example of a method for monitoring changes to web page content and constructing a change curve based on the monitored changes. Flow diagram 300A includes seven blocks 302-310, 310a, and 310b. Implementations of flow diagram 300A may be realized, for example, as processor-executable instructions and/or as part of web software 104 (of FIG. 1A), including at least partially by a change data analyzer 222 (of FIG. 2B).

In an example embodiment, at block 302, web page content at a first time is compared to web page content at a second time. For example, content 112a of web page 102a at time t1 may be compared to content 112b of web page 102b at time t2. At block 304, it is determined whether at least one change has been detected based on the comparison(s). If there are no differences in the content, the method of flow diagram 300A continues at block 302 with another comparison at a new time index instant.

If, on the other hand, one or more changes in the content are detected (at block 304), then at block 306 an amount of change between the web content at the two different times is measured. For example, the amount of similarity between the content of two different versions of a web page may be measured (e.g., using Dice, Jaccard, cosine or probabilistic measures). It should be understood that the acts of comparing and detecting may be performed as part of and/or as being based on the act(s) of measuring. For instance, if a non-zero amount of change is measured at block 306, it may be considered both a comparison of web page content and a detection of change to the web page content.

The amount of change and the corresponding time indexes for each measurement may be recorded for subsequent use. At block 308, the comparisons, detections, and measurements (of blocks 302-306) are repeated at multiple time instants. For example, if a change curve is to be constructed, content 112a of web page 102a at time t1 may be compared to content 112c of web page 102c at time t3 so that the amount of change with respect to an "initial" time may be measured (with the initial time being t1 in this example).

After a sufficient amount of data has been ascertained, a change curve is constructed at block 310. An example change curve is described below with particular reference to FIG. 3B. To construct a change curve, at block 310a elapsed time is plotted versus an amount of change to web page content using the data measured at block 306. An inflection point that is termed a knot point may also be determined at block 310b.

Figure 3B:
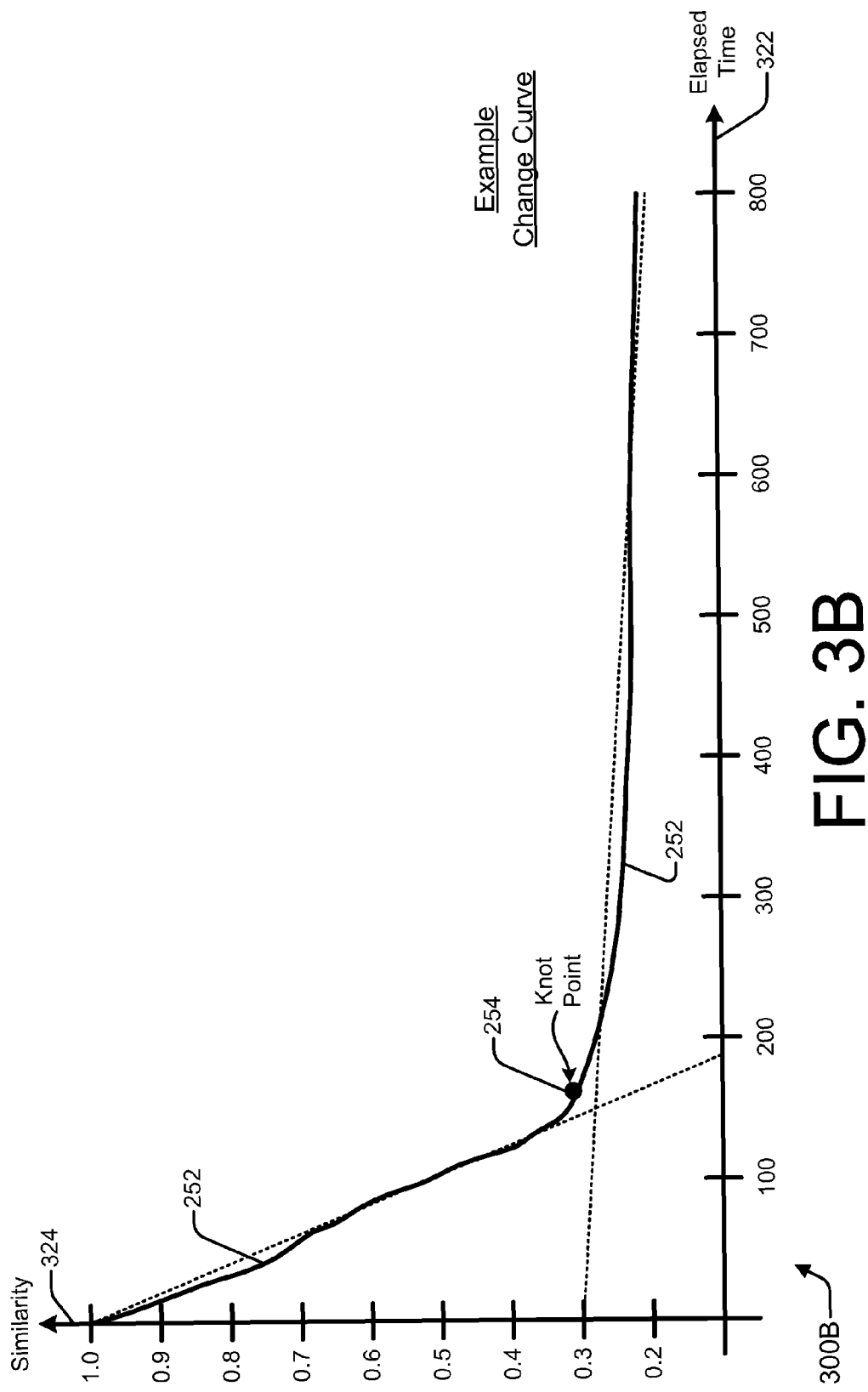
FIG. 3B depicts an example change curve that graphs elapsed time versus amount of change to web page content.

FIG. 3B depicts at 300B generally an example change curve 252 that graphs elapsed time 322 versus amount of change to web page content. As illustrated, elapsed time 322 is graphed along the abscissa axis (x-axis) in units of 100 s of hours from 0 to over 800 hours. The example amount of change metric for this graph is similarity. Similarity 324 is graphed along the ordinate axis (y-axis) in units of 0.1 from 0.1 to 1.0. Similarity may be calculated using, for instance, Dice, Jaccard, cosine or probabilistic measures or other such textual comparison techniques/mechanisms.

For an example embodiment, change curve 252 is graphed with time versus an amount of change to the content of a web page. More specifically, change curve 252 plots measured similarity at different elapsed times. These elapsed times and content differences are relative to one or more time instants that are given to be the "initial" web page version or versions at or near time=0 hours. As shown, change curve 252 initially descends at a relatively steep angle as the content of the corresponding web page changes rapidly. Eventually, the amount of change levels off and change curve 252 becomes relatively flat once there are few additional incremental differences between a given content version and the previous content version relative to the initial version(s).

Investigation reveals that the "L" or hockey stick shape is common for change curves 252. This shape includes at least one inflection point, which is termed a knot point 254. Knot point 254 indicates a time when the amount of change to the content of the web page approximately ceases with respect to the reference content. Generally, knot points 254 can be determined (e.g., located) using a scheme that involves applying a series of piecewise linear models.

More specifically, an example quantitative approach for constructing change curves and determining their knot points is described below. However, it should be understood that alternative approaches may be employed instead. For each web page, up to n starting initial points (such as 5) are selected at random (e.g., biased toward the first week or so of samples). $D_t$ is defined to represent the web page content at time t, and $D_{r1}$ is defined to be the content at the first randomly selected time. Content is the web page stripped of markup. The value of the change curve at each time instant, t, is calculated as the average Dice coefficient from each of the randomly selected initial starting points to the web page content t time steps in the future. This change curve value at time t is given by the following equation:

$$\text{change}(t) = \frac{\sum_{s}^{r1...rn} \text{dice}(D_s, D_{s+t})}{n}.$$

Change curves provide a visual synopsis representing a web page's evolution over time. Investigation indicates that the general form of change curves is that of the letter "L" or a "hockey stick" (as shown in FIG. 3B). It is apparent that many web pages change relatively rapidly from a given initial starting point as content shifts off the web page or is otherwise changed during the first "few" hours. For example, in a blog homepage, specific posts move off the page at a certain rate as new posts are made, thus causing a rapid falloff in Dice similarity. At the inflection point (e.g., the location at which the change curve flattens), the similarity of the initial web page(s) to each of the subsequent versions is approximately equal. This does not mean that each of the versions of the web page after this inflection point is the same, but rather it means that their respective similarities relative to the initial starting point are approximately equal to each other. Thus, the knot point is located at a time instant when the amount of change to the content of the web page approximately ceases with respect to the reference content from one or more web pages. Although an example change curve shape that is described herein is the hockey stick, change curves may take other shapes. Moreover, shapes for change curves may be fit to change data in manners that differ from those that are described herein.

In the blog example, each of the posts that were present at the initial sample has usually moved off the web page and what remains is text that typically resides on the page. Stated more generally, the textual content past the inflection point that is similar to the original version may be considered a combination of template information and a rough representation of the underlying language model of the page.

To compare different web pages to each other, to group similar pages, and/or to determine the relationship between revisitation behavior and content change, the information included in change curves may be extracted in one or more ways. Because change curves are generally hockey-stick-shaped, this extraction may be accomplished by identifying a change curve's inflection point, or knot point, and by fitting two linear regressions to the curve—one up to the knot, and the other following it. Piecewise linear regression is a well-known problem that can be handled either by knowing the knot location a priori or determining it through a grid search with a well defined objective function. To find knot points relatively efficiently, a heuristic scheme that works well in practice can be employed.

In an example implementation of the heuristic scheme, an algorithm first fits one linear segment to the full change curve. The leftmost intersection of the fitted curve to the change curve becomes the initial guess for the knot location. A segment is then fit to the portion of the change curve occurring before the knot. The knot point is incremented as long as the mean-squared error of the estimate of the first segment does not increase. To keep the knot from drifting too far, its motion may be restricted a predetermined number of hours (e.g., 24 hours) to the right. Because investigations indicate that the knot point typically appears before the final 200 hours (of about five weeks of monitoring) of each sampled web page, the post-knot portion of the curve may be represented by fitting a linear regression to the last 200 hours of the change curve. The final knot point is calculated as the intersection of the two regressions.

It should be noted that in certain situations, no knot point appears within the sampled time period. In these cases, the change curve generally appears to be constantly decaying (or flat) from the initial starting time until the last sampled point and is therefore capable of being approximated with one segment. The algorithm described above generally either determines the knot point to be at 0, or it fits two nearly-equal-sloped curves. In such cases, the single linear function can be used to describe the curve, and its knot point is undefined.

Although many, if not most, change curves adhere to the hockey stick shape, two other shapes also appear with some frequency. Using the analysis above, there are at least three types of change curves: knotted (two piecewise linear, the "hockey stick" shape); flat (one unchanging, 0 slope line); and sloped (one linear regression with no obvious knot). The combination of knot point and characteristic regression information (e.g., slopes and intercepts) may provide a representation of the change data in terms of a change curve. These values may also be used to classify change curves into the three identified categories. Change analyses, as described above, can be applied to entire web pages and/or to portion(s) of web pages. Different web page portions may be identified using any number of page analysis algorithms.

4: Example Revisitation Curve Implementations for Revisitation Characteristics Revisitation data may be analyzed to produce a revisitation curve. Generally, a revisitation curve represents the inter-visit times (e.g., revisit periods) to a web page by at least one user to reflect the revisitation pattern. More specifically, a revisitation curve may be a normalized histogram of inter-visit times for one or multiple users that are visiting (and revisiting) a specific web page to characterize the page's revisitation pattern.

Figure 4A:
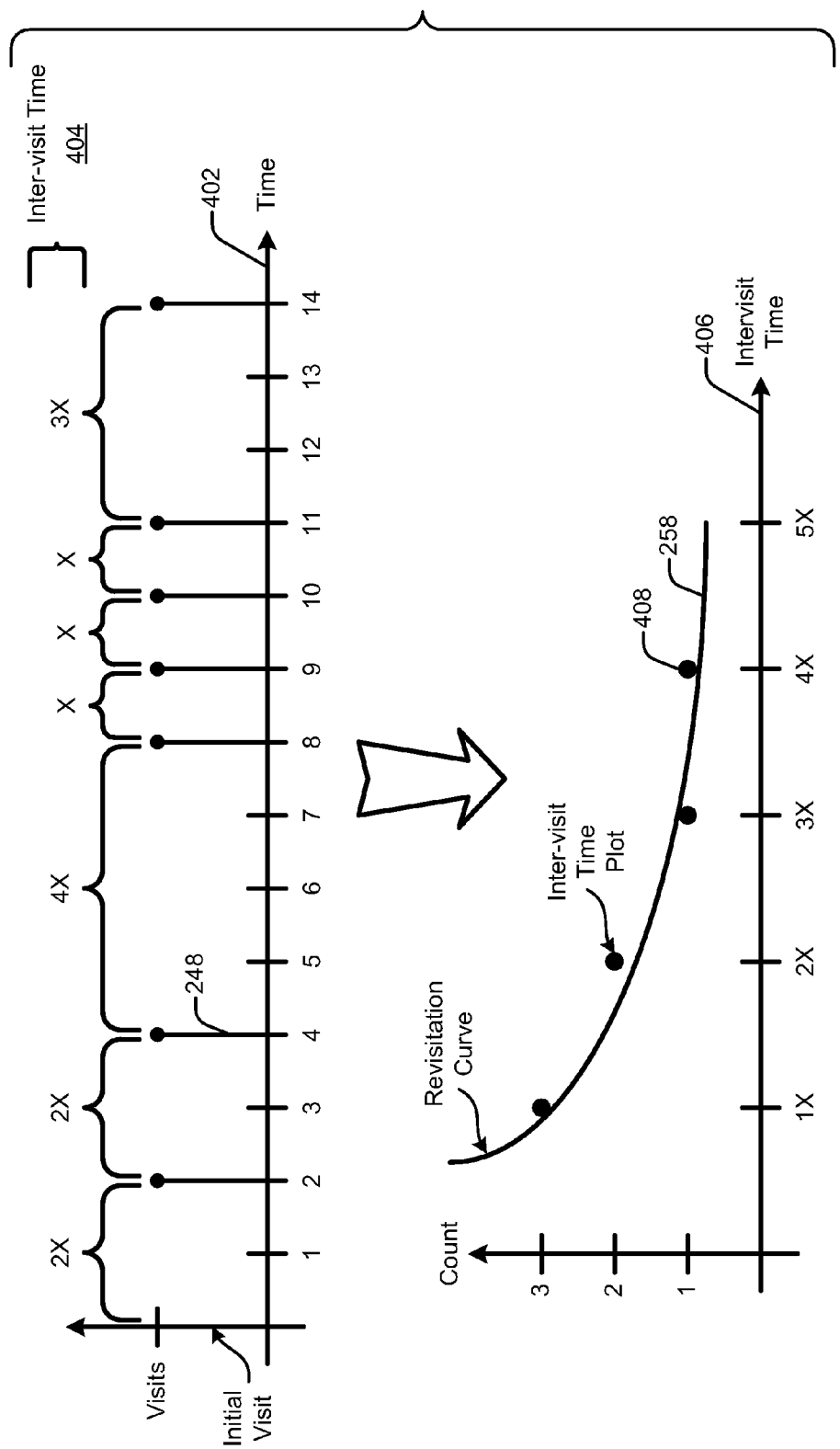
FIG. 4A depicts a pair of graphs showing inter-visit times for constructing an example revisitation curve.

FIG. 4A depicts at 400A generally a pair of graphs showing inter-visit times 404 for constructing an example revisitation curve 258. The upper graph 402 plots visits and represents time along the abscissa axis and a visit along the ordinate axis. Each visitation time 248 represents a time-stamped interaction with the corresponding web page by a user. Seven visitation times 248 are graphed at the following time units: 2, 4, 8, 9, 10, 11, and 14. (There is also an initial visit at time=0 along the ordinate axis.)

Inter-visit times 404 represent the revisit period between two (e.g., consecutive) visitation times 248. An average of the inter-visit times 404 for one or a number of users may be employed as an average inter-visit time. With "X" representing one time unit, the seven illustrated inter-visit times 404 are, from left to right: 2X, 2X, 4X, X, X, X, and 3X. In revisits graph 402, there are therefore three inter-visit times 404 of X duration, two inter-visit times 404 of 2X duration, and one inter-visit time 404 of both the 3X and 4X durations. The inter-visit times 404 may be for a single user or for a group of users. Consequently, the resulting revisitation characterization (e.g., including a revisitation curve 258) can be produced in the aggregate (e.g., pertaining to multiple users) or be produced on an individual basis (e.g., pertaining to one user). Aggregated revisitation characterizations may be beneficial because such information can be used to support a particular user's experience even for web pages that the particular user has never before visited. Individual revisitation characterizations, on the other hand, may be beneficial because, when there is sufficient information about the individual's revisitation pattern, the individual's experience can be tailored specifically to his or her own revisitation pattern.

The lower graph 406 is a histogram that represents inter-visit times along the abscissa axis and counts along the ordinate axis. The inter-visit times 404 of revisits graph 402 are plotted on histogram graph 406 as inter-visit time plots 408. Hence, from revisits graph 402, there are three counts at the 1X inter-visit mark, two counts at the 2X inter-visit mark, one count at the 3X inter-visit mark, and one count at the 4X inter-visit mark. The four inter-visit time plots 408 on histogram graph 406 define a curve, revisitation curve 258.

Figure 4B:
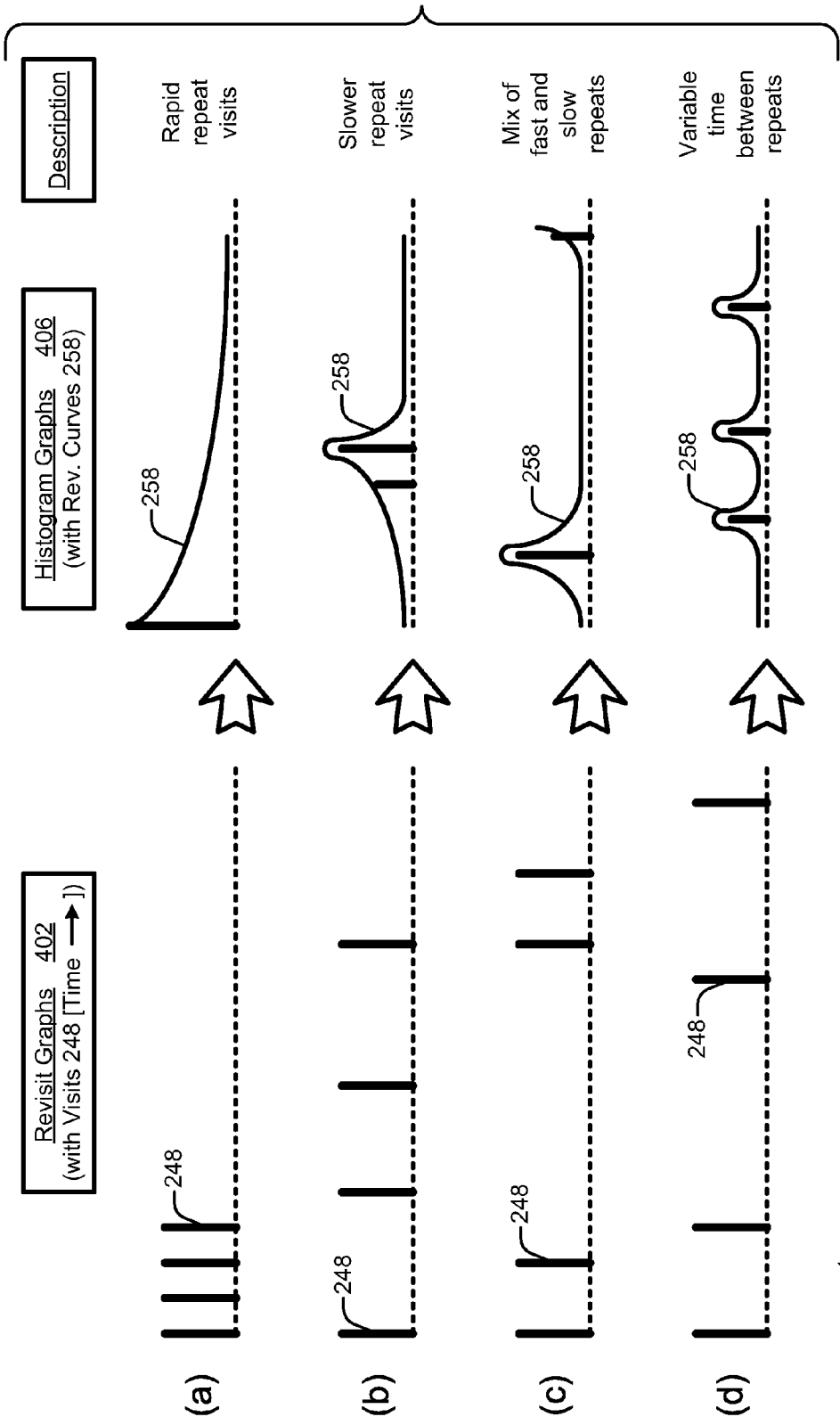
FIG. 4B depicts four example graph pairs for constructing four different revisitation curves.

FIG. 4B depicts at 400B generally four example graph pairs (a)-(d) for constructing four different revisitation curves. There are revisit graphs 402 on the left and histogram graphs 406 on the right. Each revisit graph 402 includes four visitation times 248. The four graph pairs at 400B thus illustrate the relationship between page visits and revisitation curves. For each graph pair (a)-(d), four page visits are represented at four visitation times 248 as four bars along a time line. The resulting revisitation curve 258 is a histogram of the inter-visit times. In histogram graphs 406, the abscissa axis represents the inter-visit time interval, and the ordinate axis represents a count of the number of visits to the web page separated by that interval. The bars in the histogram graphs 406 are thus of different heights, depending on the count total (e.g., one, two, or three).

The specific density of visits determines the shape of the revisitation curve 258. For example, the web page corresponding to the first graph pair (a) has four visits in rapid succession, and none at longer intervals. Hence, the revisitation curve 258 for graph pair (a) shows a high number of revisitations in the smallest interval bin. In contrast, visits in the second graph pair (b) are spread out, which shifts the peak of the revisitation curve 258 to the right (corresponding to a higher inter-arrival time bin). The third graph pair (c) includes two fast repeat visits and one long inter-visit time. The fourth graph pair (d) includes inter-visit times of varying lengths.

In short, graph pair (a) has rapid repeat visits, graph pair (b) has slower repeat visits, graph pair (c) has a mix of fast and slow repeat visits, and graph pair (d) has variable times between repeat visits. It should be noted that the number of visits in each graph pair is the same. Thus, the same number of visits per user can result in very different revisitation curves 258.

By way of specific example, revisitation curves may be generated first by calculating the inter-arrival times between consecutive pairs of visits. Exponential bins may be used to characterize the inter-arrival times. Manual tuning of the bin boundaries may be employed to generate more descriptive timescales. Comprehendible boundaries may be, for example: one minute, five minutes, ten minutes, half an hour, one hour, two hours, eight hours, one day, two days, one week, two weeks, and a month. It should be noted that even if a histogram graph is not literally constructed, binning inter-visit times can facilitate further analysis when producing a revisitation characterization.

Because histograms are count based, web pages that have many more visitors and/or more revisits per visitor will have higher counts. In order to compare revisitation patterns between such web pages, their revisitation curves may be normalized. By way of example, each individual curve may be normalized by the centroid (e.g., the average) of each of the curves. To complete the normalization, for each web page the un-normalized bins in each revisitation curve are divided by the corresponding count in the centroid. Thus, for each bin, i, the normalized revisitation curve may be computed using the following equation:

$$(\text{normalized)}\ \text{revisit-curve}_{page}[i] = \text{count}_{page}[i]/\text{centroid}[i].$$

From a high-level perspective, the normalized revisitation curve for each web page roughly represents the percentage over, or under, revisits to that web page as compared to the average revisitation pattern. Although normalization is achieved with the equation above by dividing out the centroid, there are a number of other ways to normalize this type of data that may be implemented. Alternative examples include normalizing to a 0-1 range, subtracting out the centroid, and so forth. As described further below, however, normalizing by finding a quotient with the centroid enables both comparisons and groupings of the different revisitation behavior patterns. It should be noted that data may be cleaned in other ways, instead of or in addition to normalizing. Example data cleansing approaches include, but are not limited to, normalizing the data, removing spurious and/or noisy data, extrapolating/interpolating the data, averaging the data, combinations thereof, and so forth.

Figure 4C:
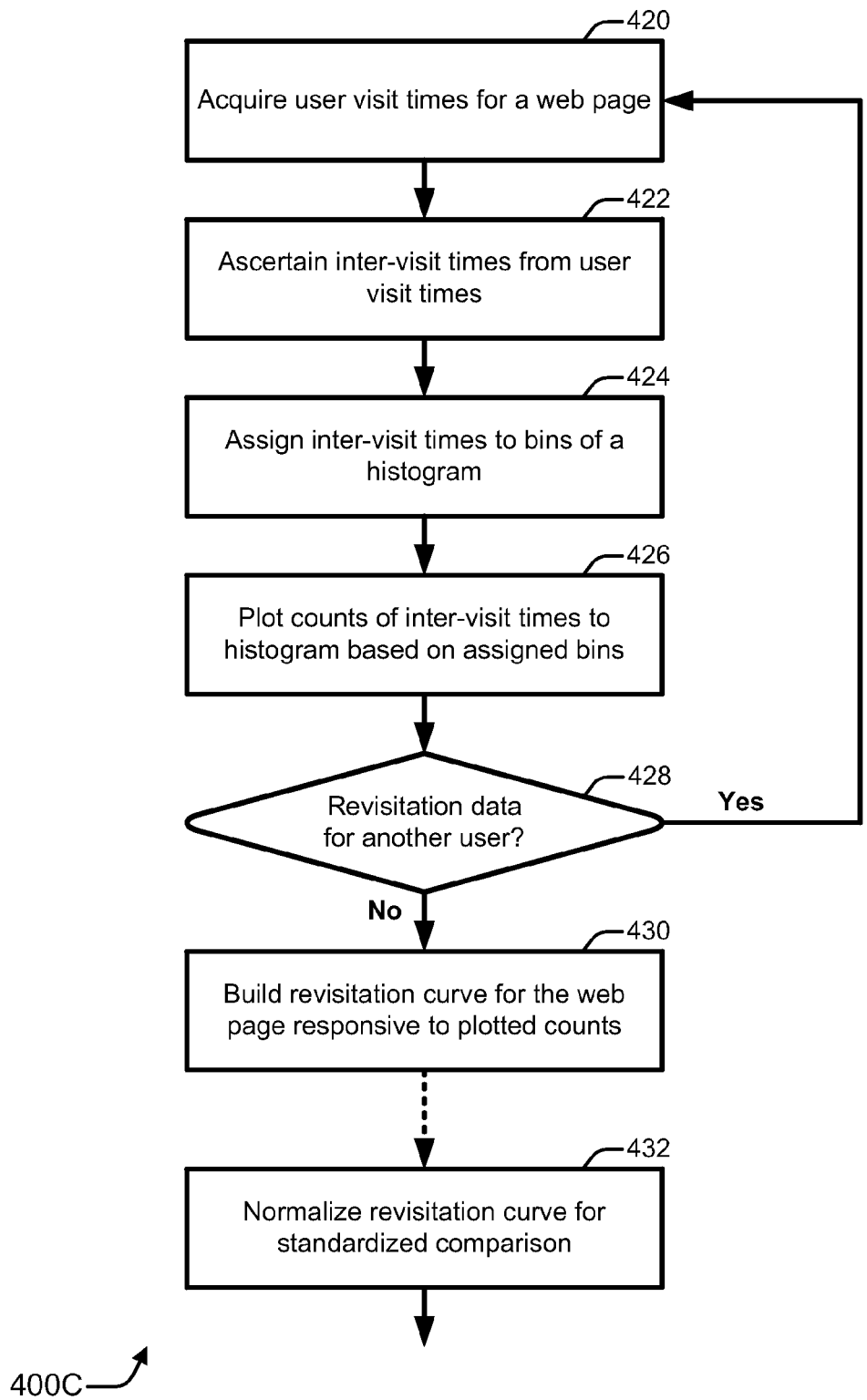
FIG. 4C is a flow diagram that illustrates an example of a method for constructing a revisitation curve.

FIG. 4C is a flow diagram 400C that illustrates an example of a method for constructing a revisitation curve. Flow diagram 400C includes seven blocks 420-432. Implementations of flow diagram 400C may be realized, for example, as processor-executable instructions and/or as part of web software 104 (of FIG. 1), including a revisitation data analyzer 224 (of FIG. 2B).

In an example embodiment, at block 420, one or more user visit times for a web page are acquired. For example, visit times 248 corresponding to a user identification 244 and a page identification 246 may be acquired. At block 422, inter-visit times are ascertained from the user visit times. For example, inter-visit times 404 may be ascertained from user visit times 248.

At block 424, inter-visit times are assigned to bins of a histogram. For example, inter-visit times 404 may be assigned to bins of a histogram graph 406. At block 426, counts of inter-visit times are plotted to the histogram graph based on the assigned bins. For example, the counts per inter-visit time 404 may be plotted as inter-visit time plots 408 on histogram graph 406.

At block 428, it is determined if there is revisitation data for another user. For example, it may be determined if there is additional revisitation data 124 for a different user identification 244 that corresponds to the same page identification 246. If so, the method of flow diagram 400C continues at block 420, and the count value of relevant inter-visit time plots 408 may be increased as appropriate for the revisitation data of additional users. (Alternatively, the plotting of block 426 may be performed after a negative determination at block 428.)

If, on the other hand, it is determined (at block 428) that there is no additional revisitation data for analysis, then flow diagram 400C continues at block 430. At block 430, a revisitation curve for the web page is built responsive to the plotted counts. For example, a revisitation curve 258 may be built from the inter-visit time plots 408. Additionally, at block 432, the revisitation curve may be normalized for standardized comparisons. For example, revisitation curve 258 may be normalized using, e.g., a centroid for a number of revisitation curves to enable a standardized comparison between and among different revisitation curves corresponding to different web pages.

Examples of revisitation curves for two specific web pages are: 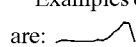—for a popular general-interest internet retailer that offers an expansive number of product categories. This revisitation curve peaks towards the right, which indicates that most revisits occur after a relatively longer time period (e.g., over a day).

—for a well-known news site that covers general national news. This revisitation curve displays a peak on the left, which is perhaps driven by automatic reloads, along with a higher middle region, which is perhaps due to users checking for the latest news.

Each revisitation curve may be considered to be a signature of user behavior with respect to accessing a corresponding web page. Given a revisitation curve representation of user behavior, the range of such curves may be investigated. To organize these curves, a clustering algorithm may be applied to recognize curves that have similar shapes and/or magnitudes. Specifically, and by way of example, a repeated-bisection clustering with a cosine similarity metric and the ratio of intra- to extra-cluster similarity as the objective function may be used. Experimental investigation indicates that clusters are fairly stable regardless of the specific clustering or similarity metric. Thus, alternative clustering approaches and/or similarity metrics may be employed to investigate commonalities and differences between and among revisitation curves.

By varying the number of clusters and testing within- and between-cluster similarity, it has been discovered that the objective function levels off at around 12 clusters. Although 12 clusters were discovered for approximately a month's worth of revisitation data, longer data collection periods may result in raw visitation data that produces a different total number of clusters. These 12 clusters are graphically presented in Table 1 below and are designated by F1-F5, M1-M2, S1-S4, and H1. As shown in Table 1, these 12 clusters have been further ordered, named, and manually grouped based on general trends into four groups: fast, medium, slow, and hybrid. These four revisitation curve group categories 260 (of FIG. 2C) are described at a relatively high level herein below with particular reference to FIG. 4D.

Many revisitation patterns were located at the extremes. Five clusters F1-F5 represented primarily fast revisitation patterns, in which people revisited the associated member web pages many times over a short interval but rarely revisited over longer intervals. On the other hand, four clusters S1-S4 represented slow revisitation patterns, with people revisiting the associated member pages mostly at intervals of a week or more. Between these two extremes are two other groups of clusters. One is a hybrid combination cluster H1 of fast and slow revisitations; it displays a bimodal revisitation pattern. The other group includes two medium clusters M1-M2 having web pages that are revisited primarily at intervals of between an hour and a day. The clusters in this medium group are less peaked and show more variability in revisitation intervals than the fast or slow groups.

Table 1 below presents and describes four example revisitation curve group categories: fast, medium, slow, and hybrid. Each group category may be further subdivided into revisitation clusters. Twelve example revisitation clusters are shown: F1, F2, F3, F4, F5, M1, M2, S1, S2, S3, S4, and H1. A general example description of each grouped category is also presented.

TABLE 1

Example revisitation curve group categories and cluster subdivisions.

| Cluster Group | Name | Shape | Description |
| --- | --- | --- | --- |
| Fast Revisits (<hour) 23611 pages | F1 |  | Pornography & Spam, Hub & Spoke, Shopping & Reference Web sites, Auto refresh, Fast monitoring |
| | F2 |  | |
| | F3 |  | |
| | F4 |  | |
| | F5 |  | |

TABLE 1-continued

Example revisitation curve group categories and cluster subdivisions.

| Cluster Group | Name | Shape | Description |
|---|---|---|---|
| Medium (hour to day) 9421 pages | M1 | ⌢ | Popular homepages, Communication, .edu domain, Browser homepages |
| | M2 | ⌒ | |
| Slow Revisits (>day) 18422 pages | S1 | ╱ | Entry pages, Weekend activity, Search engines used for revisitation, Child-oriented content, Software updates |
| | S2 | ⌁ | |
| | S3 | ⌁ | |
| | S4 | ⌣ | |
| Hybrid 3334 pages | H1 | ⌣ | Popular but infrequently used, Entertainment & Hobbies, Combined Fast & Slow |

As noted above, a portion of the investigation and analysis into web page revisitation included the dissemination of surveys. The self-reported, survey-based revisitation data reinforced the selection of this grouping criteria as revisitation patterns from the surveys were fairly consistent, not only with each individual participant's observed page interactions, but also with overall patterns in the aggregate log data. Participants tended to report hourly or daily visits to web pages that were clustered as fast or medium-term revisitation. They tended to report weekly, monthly, or longer revisits to those web pages categorized as having slow revisitation patterns. The self-reported regularity of access decreased as the visitation interval increased. Participants reported visiting medium web pages at regular intervals and slow web pages at irregular intervals.

Figure 4D:
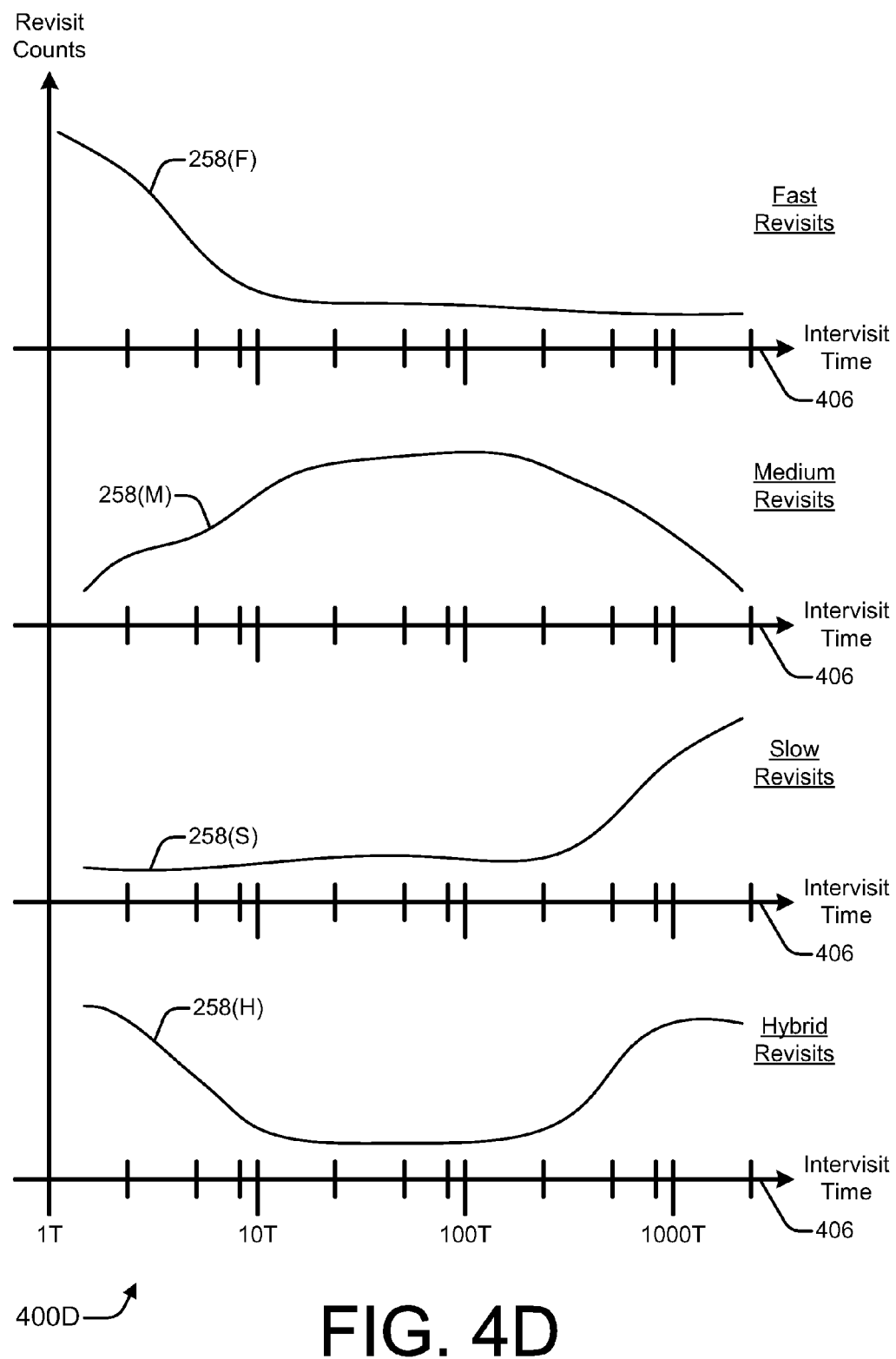
FIG. 4D depicts four example revisitation curves that reflect four revisitation curve group categories.

FIG. 4D depicts at 400D generally four example revisitation curves 258 that reflect four group categories. These revisitation curve group categories 260 (of FIG. 2C) are graphed on four histogram graphs 406. Each histogram graph 406 represents inter-visit time along the abscissa axis and revisit counts along the ordinate axis. The inter-visit time of the abscissa axis is graphed on a logarithmic scale with time units (T) that are explicitly denoted at 1 T, 10 T, 100 T, and 1000 T.

Each of the revisitation curves 258 in FIG. 4D represents a general example curve for a group category. Individual revisitation curves may vary while still fitting within a given group category. A fast revisitation group category is reflected by fast revisitation curve 258(F). It resembles a downward sloping ramp on the left and is relatively flat in the center and right portions. As indicated in Table 1 above, a revisitation curve may differ from revisitation curve 258(F) and nevertheless be classifiable within the fast revisitation group category. For instance, the left portion may resemble a peaked mountain (e.g., clusters F3 and F4) having both upward and downward ramp shapes instead of merely a downward ramp shape.

A medium revisitation group category is reflected by medium revisitation curve 258(M). It resembles a hill shape that is higher in the central portion and lower at the right and left portions. A slow revisitation group category is reflected by slow revisitation curve 258(S). It resembles an upward sloping ramp on the right and is relatively flat in the left and center portions. A hybrid revisitation group category is reflected by hybrid revisitation curve 258(H). It resembles a valley shape that is lower in the central portion and higher at the right and left portions.

Figure 4E:
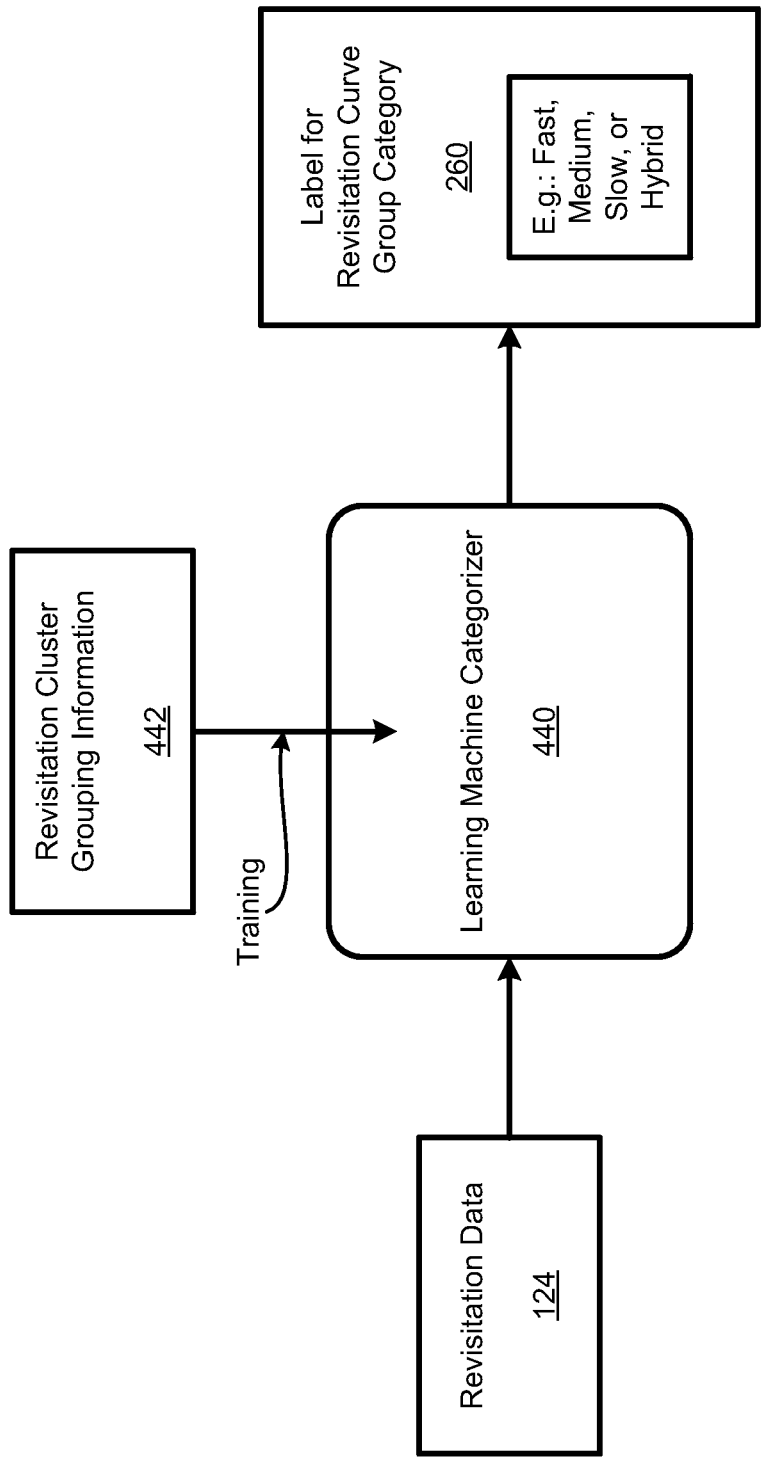
FIG. 4E is a block diagram of an example approach to assigning a revisitation curve group category to revisitation data.

FIG. 4E is a block diagram of an example approach 400E to assigning a revisitation curve group category 260 to revisitation data 124. The example revisitation curve group categories, which are described above and illustrated in FIG. 4D and which were identified through clustering, can be used to label revisitation data 124 to aid in understanding a particular page's web revisitation pattern 110 (of FIG. 1A), to organize web pages by revisitation curve group category, and so forth. As illustrated, approach 400E includes revisitation data 124, a label for revisitation curve group category 260, a learning machine categorizer 440, and revisitation cluster grouping information 442. Learning machine categorizer 440 may be realized as part of revisitation data analyzer 224 (of FIG. 2B).

In an example embodiment, revisitation data 124 is input to learning machine categorizer 440. After analysis in accordance with its learning algorithm, learning machine categorizer 440 outputs a label for revisitation curve group category 260 that reflects the input revisitation data. Using the revisitation curve group categories of FIG. 4D, the label may be, for example, fast revisitation, medium revisitation, slow revisitation, or hybrid revisitation. For training purposes, revisitation cluster grouping information 442, which may be derived from application of a clustering algorithm to revisitation data, is applied to learning machine categorizer 440. By way of example, learning machine categorizer 440 may be powered by any learning algorithm, such as a support vector machine (SVM), neural networks, genetic algorithms, K-nearest neighbor algorithms, decision trees, a combination or kernelized version thereof, and so forth.

With reference to the act(s) of block 204 (of FIG. 2A), analysis may include applying revisitation data 124 from one or more users for a web page to a learning machine categorizer 440 and producing a revisitation curve group category 260 label that may constitute a revisitation characterization 228. The revisitation curve group category label may be, for example, fast revisitation, medium revisitation, slow revisitation, or hybrid revisitation. This revisitation curve group category may be associated with the web page and then utilized to support web interaction.

Figure 5A:
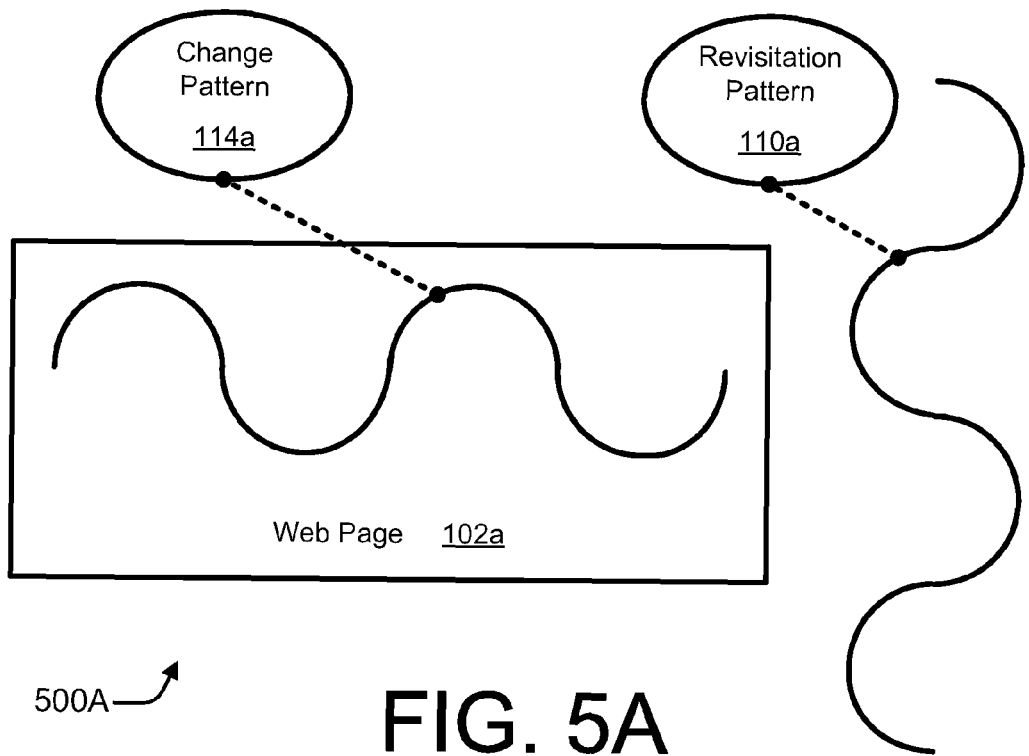
FIG. 5A illustrates an example of a strong relationship between a change pattern and a revisitation pattern for a web page.

5: Example Embodiments for Relating Data and Inferring User Consumption Intent FIG. 5A illustrates an example of a strong relationship 500A between a change pattern 114a and a revisitation pattern 110a for a web page 102a. These curves summarize the amount of change or revisitation at different points in time. These temporal patterns can be converted to change curves 252 or revisitation curves 258 as described herein above with reference to FIG. 3B and FIG. 4A, respectively. As illustrated, web page 102a is associated with change pattern 114a. Revisitation pattern 110a corresponds to web page 102a. In an example embodiment, it is determined if there is a resonance between change pattern 114a and revisitation pattern 110a. For example, it may be determined if the rate of change is approximately equal to the rate of revisitation. Whether these rates are approximately equal may be determined, for instance, based on experimentation.

When there is a resonance between the two patterns, change pattern 114a may be considered to be strongly related to revisitation pattern 110a. As shown in FIG. 5A, relationship 500A is a strong relationship because the frequencies of change and revisitation match. In such a situation, it can be inferred that users are interested in the dynamic content of web page 102a. This is likely to be particularly true if the rate of revisitation is somewhat greater than the rate of change because this relationship indicates that users are interested in accessing content before it is removed from web page 102a due to changes.

Figure 5B:
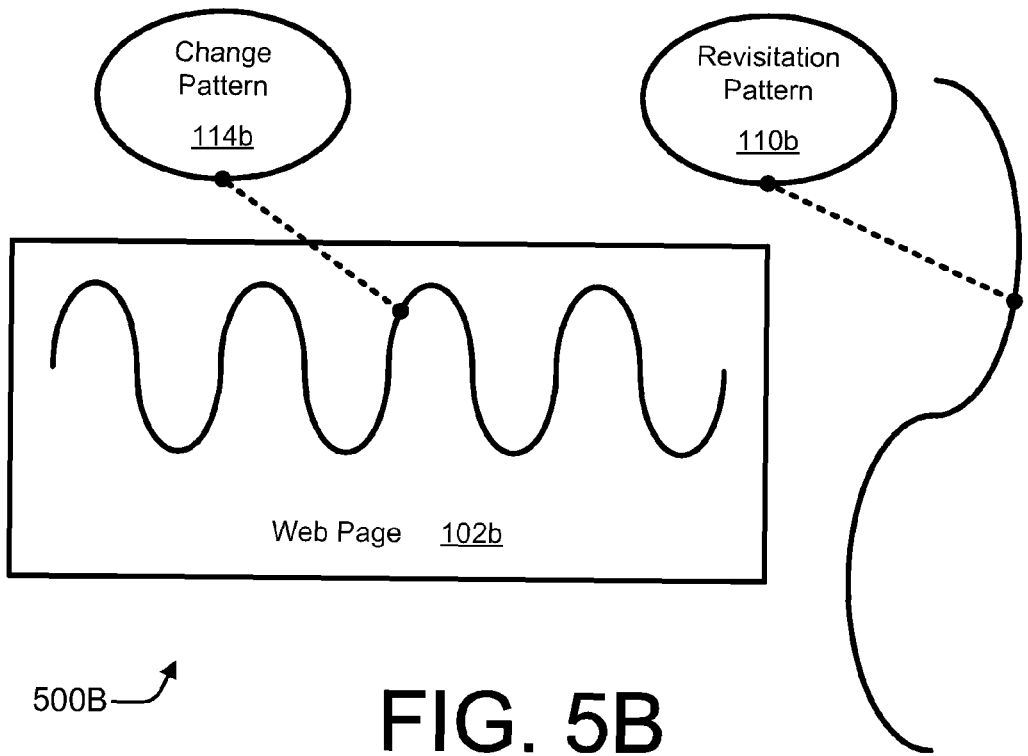
FIG. 5B illustrates an example of a weak relationship between a change pattern and a revisitation pattern for a web page.

FIG. 5B illustrates an example of a weak relationship 500B between a change pattern 114b and a revisitation pattern 110b for a web page 102b. As illustrated, web page 102b is associated with change pattern 114b. Revisitation pattern 110b corresponds to web page 102b. For an example embodiment, it is determined if there is a resonance between change pattern 114b and revisitation pattern 110b. For example, it may be determined if the rate of change is approximately equal to the rate of revisitation.

When there is not a resonance between the rates of change and revisitation, change pattern 114b may be considered to be weakly related to revisitation pattern 110b. As shown in FIG. 5B, relationship 500B is a weak relationship because the frequencies of change and revisitation do not match (e.g., the rate of change of change pattern 114b is substantially greater than the rate of revisitation of revisitation pattern 110b, or vice versa). In the illustrated situation, the rate of change is significantly greater than the rate of revisitation. It can thus be inferred that users are likely to be interested in the static content of web page 102b because these relative rates indicate that users are not particularly concerned with ensuring that they are able to access changing content before it is altered or removed from web page 102b.

Figure 5C:
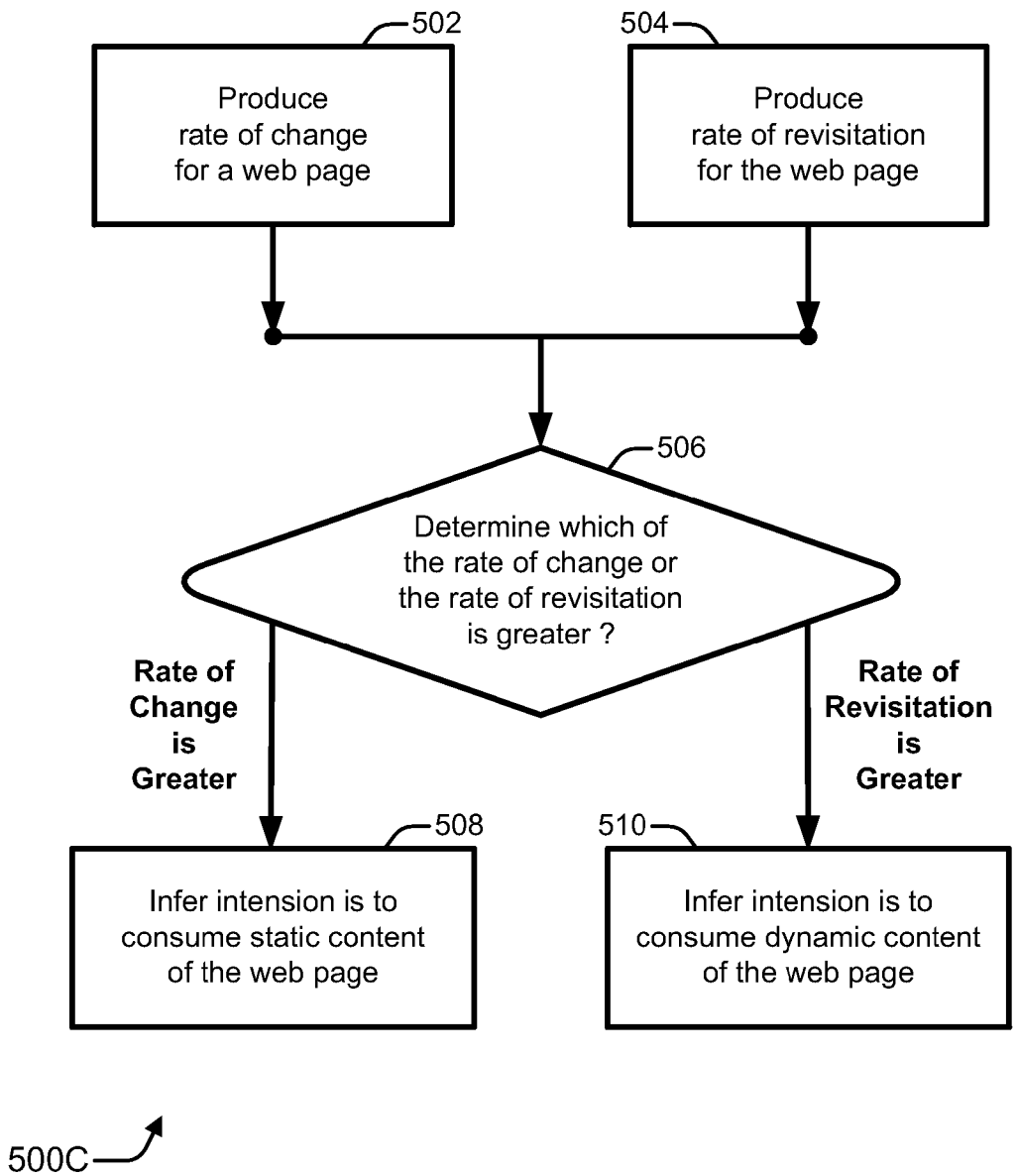
FIG. 5C is a flow diagram that illustrates an example of a method for ascertaining user consumption intent between static content and dynamic content of a web page.

FIG. 5C is a flow diagram 500C that illustrates an example of a method for ascertaining user consumption intent between static content and dynamic content of a web page. Flow diagram 500C includes five blocks 502-510. Implementations of flow diagram 500C may be realized, for example, as processor-executable instructions and/or as part of web software 104 (of FIG. 1A), including at least partially by the components of FIG. 2B.

It should be understood that a distinction between static content and dynamic content of a web page is not necessarily a discrete one or one with universal boundaries. In other words, analysis of the rate and/or amount and/or type of change of the content of a web page may involve a continuum that includes static content and dynamic content. For example, some static content may also be considered slowly-changing dynamic content. Thus, different embodiments may define static and dynamic content differently. They may be defined by a developer or by a user. Moreover, a cross-over point or zone between static content and dynamic content may be specified by the developer, by the user, by a heuristic that adjustably defines static versus dynamic content in response to local or global activities during operation, and so forth.

In an example embodiment, at block 502, a rate of change for a web page is produced. For example, change data 122 that is associated with a web page 102 may be analyzed by change data analyzer 222 to produce a rate of change, which is an example of a change characterization 226. At block 504, a rate of revisitation for the web page is produced. For example, revisitation data 124 corresponding to web page 102 may be analyzed by revisitation data analyzer 224 to produce a rate of revisitation, which is an example of a revisitation characterization 228.

At block 506, it is determined which of the rate of change or the rate of revisitation is greater. For example, change and revisitation relationship determiner 230 may compare the rate of a change pattern 114 to a rate of a revisitation pattern 110 to determine which is greater for change and revisitation relationship 232. Thus, change and revisitation relationship 232 may incorporate a comparison between the rate of change and the rate of revisitation If the rate of change is determined to be greater, then at block 508 it is inferred that the intension is to consume static content of the web page. For example, if the rate of change pattern 114 exceeds the rate of revisitation pattern 110 (e.g., as illustrated in FIG. 5B), consumption intent inference engine 234 may infer as inferred consumption intent 128 that users 106 intend to consume static content 112 of web page 102.

On the other hand, if the rate of revisitation is determined to be greater, then at block 510 it is inferred that the intension is to consume dynamic content of the web page. For example, if the rate of revisitation pattern 110 exceeds the rate of change pattern 114, consumption intent inference engine 234 may infer as inferred consumption intent 128 that users 106 intend to consume dynamic content 112 of web page 102. It should be noted that if the rate of revisitation pattern 110 substantially exceeds the rate of change pattern 114, other inferences may be more applicable. For instance, users may be quickly activating the "back" functionality of their web browser with hub-and-spoke browsing, a web page may have activated automatic reloading, and so forth.

If it is inferred that the user is interested in consuming dynamic content of the web page, the type of dynamic content may also be inferred. Example types of dynamic content include, but are not limited to: previous (i.e., old) version(s) of the content, the latest (i.e., current) version of the content, monitored changes to the content, some combination thereof, and so forth. If a previous version of the content is intended to be consumed, it may be further inferred whether the intended content has or has not been previously viewed. Example embodiments for inferring consumption intentions with regard to old content, current content, monitored changes to content, etc. are described herein below with particular reference to FIG. 6A.

Figure 5D:
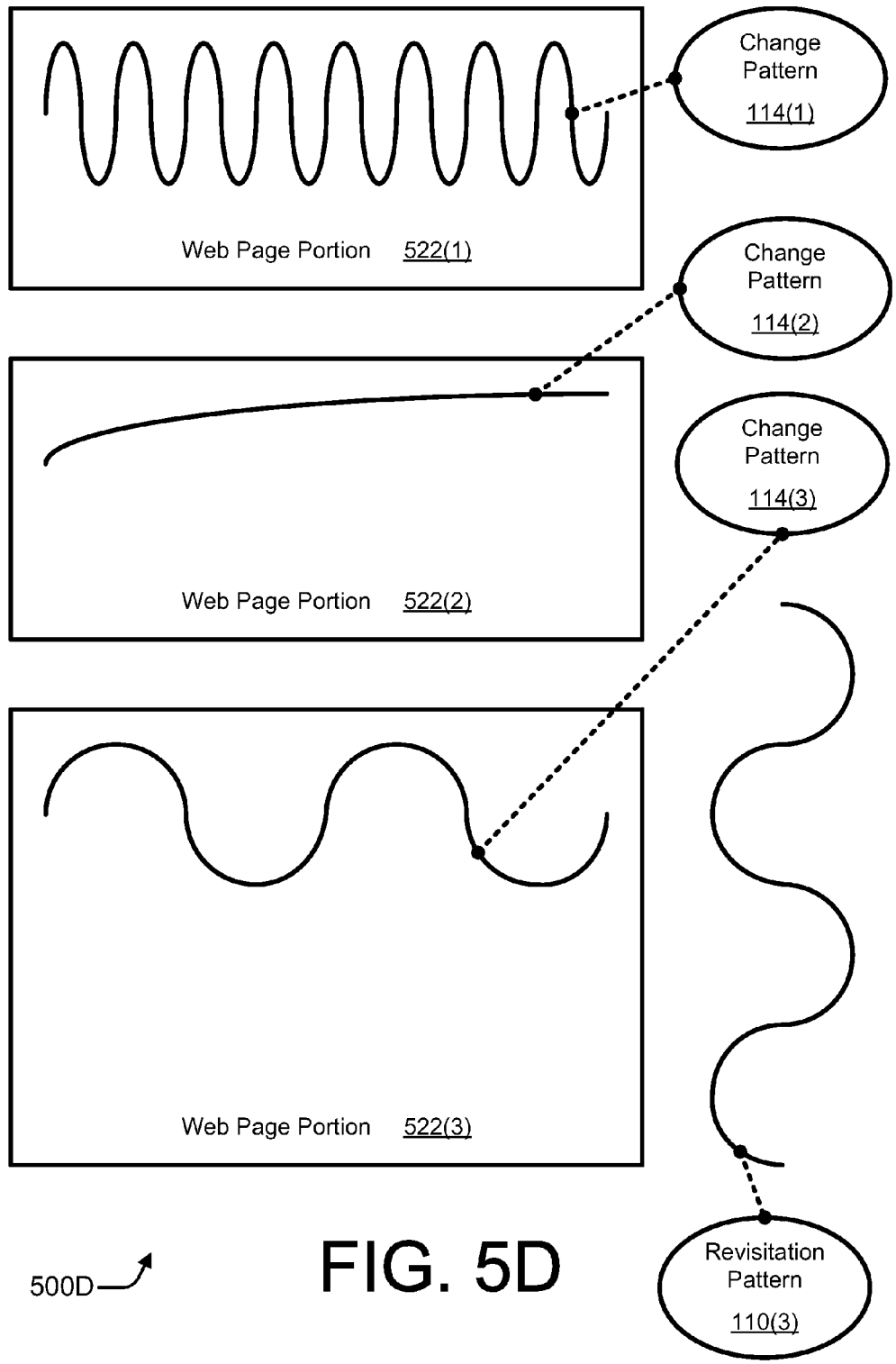
FIG. 5D illustrates an example of multiple change patterns associated with respective web page portions and a revisitation pattern that may be related to the change patterns to ascertain a match.

FIG. 5D illustrates an example of multiple change patterns 114 associated with respective ones of a set 500D of web page portions 522 within a single web page. A revisitation pattern 110 may be related to the change patterns 114 to ascertain a match. As illustrated, there are three web page portions 522 that may correspond to content 112: first web page portion 522(1), second web page portion 522(2), and third web page portion 522(3). Each respective web page portion 522(1), 522(2), and 522(3) is associated with a respective change pattern 114(1), 114(2), and 114(3).

In general relative terms, change pattern 114(1) has a fast rate of change, change pattern 114(2) has a slow rate of change, and change pattern 114(3) has a medium rate of change. For an example embodiment, first web page portion 522(1) is changed very frequently, perhaps as often as each time the web page is loaded. First web page portion 522(1) may be a banner advertisement, a set of advertisements, and so forth. Second web page portion 522(2) is changed very infrequently. It may be a navigational portion of the web page or other baseline text that is usually changed relatively rarely, such as during web site reorganizations.

Third web page portion 522(3) may be digestible content such as news, blog posts, marketed goods, social information, and so forth. In this example, revisitation pattern 110(3) has a medium rate of revisitation. When revisitation pattern 110(3) is related to change patterns 114(1), 114(2), and 114(3), it may be determined that revisitation pattern 110(3) matches change pattern 114(3). For example, the rate of change for change pattern 114(3) is approximately equal to the rate of revisitation for revisitation pattern 110(3). From this relationship, it can be inferred that users likely revisit the web page to consume the content corresponding to web page portion 522(3).

Figure 5E:
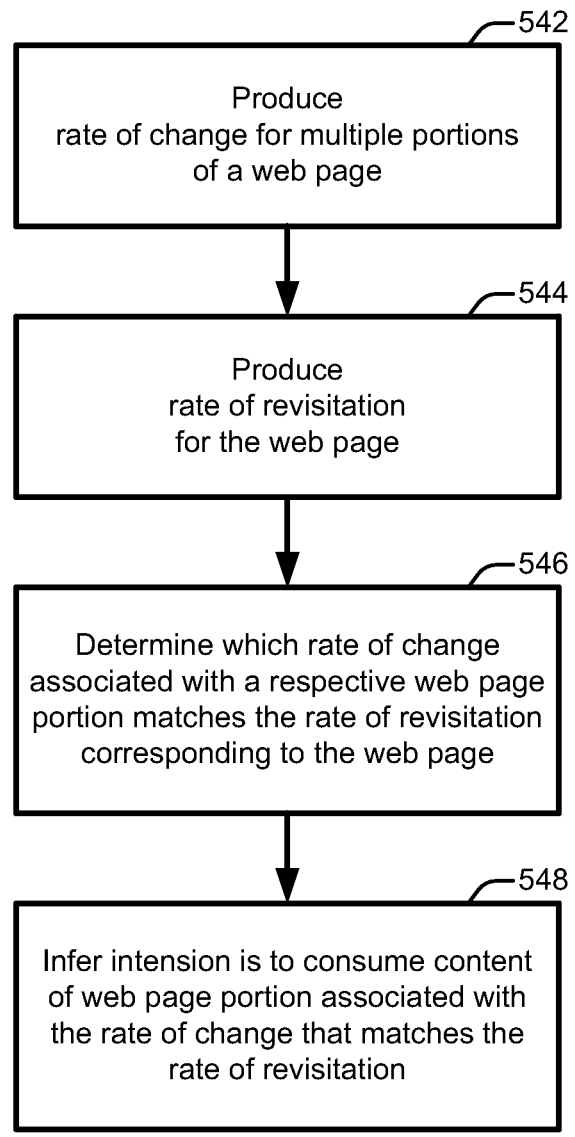
FIG. 5E is a flow diagram that illustrates an example of a method for ascertaining user consumption intent among different portions of a web page.

FIG. 5E is a flow diagram 500E that illustrates an example of a method for ascertaining user consumption intent among different portions of a web page. Flow diagram 500E includes four blocks 542-548. Implementations of flow diagram 500E may be realized, for example, as processor-executable instructions and/or as part of web software 104 (of FIG. 1A), including at least partially by the components of FIG. 2B.

In an example embodiment, at block 542, rates of change for multiple portions of a web page are produced. For example, a change data analyzer 222 may analyze change data 122 associated with multiple web page portions 522(1, 2,3) to produce multiple respective rates of change for the corresponding change patterns 114(1,2,3). A document object model (DOM) of the web page, for instance, may be parsed at different times to identify and track the changes of different web page portions 522.

At block 544, a rate of revisitation for the web page may be produced. For example, a revisitation data analyzer 224 may analyze revisitation data 124 corresponding to the web page to produce a rate of revisitation representing revisitation pattern 110.

At block 546, it is determined which rate of change associated with a respective web page portion matches the rate of revisitation corresponding to the web page. For example, a change and revisitation relationship 232 may be determined by change and revisitation relationship determiner 230 by comparing respective rates of change for respective web page portions 522 to the rate of revisitation. The determined relationship can indicate that the rate of change for change pattern 114(3), which is associated with web page portion 522(3), matches the rate of revisitation of revisitation pattern 110(3). A match may be declared, for example, to the rate of change that is closest to the rate of revisitation, when the rate of revisitation is deemed sufficiently close to a rate of change, some combination thereof, and so forth.

At block 548, it is inferred that a user intension is to consume content of the web page portion that is associated with the rate of change that matches the rate of revisitation. For example, consumption intent inference engine 234 may infer as inferred consumption intent 128 that the intension of the user is to consume the content of web page portion 522(3) responsive to the rate of change for change pattern 114(3) matching the rate of revisitation of revisitation pattern 110(3).

FIG. 5F depicts a graph 500F illustrating an example relationship between a change curve 252 and two different revisitation curves 258(F) and 258(M). As illustrated, graph 500F has an abscissa axis for the elapsed time 322 and an ordinate axis for the content similarity 324. Change curve 252 is shown as a solid line and includes a knot point 254. Fast revisitation curve 258(F) is shown as a dashed line and includes a peak 562(F). Medium revisitation curve 258(M) is shown as a dotted line and includes a peak 562(M).

In an example embodiment, a relationship may be determined between revisitation data and change data based on change curve 252 and fast revisitation curve 258(F) or based on change curve 252 and medium revisitation curve 258(M). The overall data included as part of change curve 252 and revisitation curves 258 may be related. However, in this example, the relationship is determined using knot point 254 of change curve 252 and peaks 562 of revisitation curves 258.

Fast revisitation curve 258(F) corresponds to a first web page, and medium revisitation curve 258(M) corresponds to a second web page. It is given that both web pages have the same change data as represented by change curve 252. First, a relationship between change curve 252 and fast revisitation curve 258(F) is described. The relation operation determines that peak 562(F) of fast revisitation curve 258(F) occurs before (e.g., sooner) than knot point 254 of change curve 252. In other words, the maximally-frequent rate of revisitation is greater than the average rate of change, with the average rate of change being defined by the knot point in this example. It may thus be inferred that users intend to consume the changing content of the first web page.

Second, a relationship between change curve 252 and medium revisitation curve 258(M) is described. The relation operation determines that peak 562(M) of medium revisitation curve 258(M) occurs after (e.g., later) than knot point 254 of change curve 252. In other words, the maximally-frequent rate of revisitation is lower than the average rate of change, with the average rate of change being defined by the knot point in this example. It may thus be inferred that users are not particularly interested in the changing content and may instead intend to consume the unchanging content of the second web page.

More generally, change curves for web pages may be compared to revisitation curves for web pages. There are differences in where and when revisitation curves peak relative to the knot points of the change curves. It can be inferred that these difference relate to whether users are interested more in the dynamic, changing content of a web page or in its static, stable content. In other words, there is a relationship between revisitation behavior (e.g., as represented by revisitation curve peaks) and the knot point of change curves. This relationship can indicate in which content users are primarily interested.

Investigation has revealed other general trends. For example, there tends to be a negative relationship between the popularity of a web site (e.g., as represented by the number of different visitors) and inter-change time. In other words, the frequency of change increases with increasing popularity. In contrast, there appears to be little if any relationship between elapsed time (e.g., the value of the knot point on the x-axis) and number of visitors. Thus, it can be inferred that although the rate of change is positively related to increased visitors, the time at which page change stabilizes is not as critical. On the other hand, there does appear to be a relationship between the Dice coefficient at the knot point (e.g., the value of the knot point on the y-axis) and the number of visitors. There is a general downward trend of the knot point with increasing visitors indicating that there is less overlap for more frequent pages.

Similarly to the average inter-change time, as the number of revisits is increased, the average knot point moves closer to 0. This likely indicates that users do not wish to miss changing information and therefore respond with increased revisits. How frequently a user revisits a web page also appears to be related to how often a web page is changed. In other words, users are more likely to revisit a web page that changes rapidly than a web page that changes slowly or rarely. Furthermore, rapid revisitation is more likely to be associated with change than slow revisitation. More specifically, when people revisit a page quickly (e.g., within the same day), such revisitations tend to be particularly related to how frequently the page changes (e.g., people revisit more as a web page changes more frequently). On the other hand, when a page is revisited slowly (e.g., after many weeks), such revisitations tend to be less related to how frequently the page changes.

Different relationships between revisitation behavior and knot points of change curves may be further ascertained by employing a binning scheme to the revisits around the knot point. For an example implementation, one to two bins both before and after the knot point are generated. Revisits are assigned to the bins. The levels of the bins may be normalized by the expected number of revisits. The normalized revisitation bins around the knot point can be used to infer user consumption intentions.

Figure 5G:
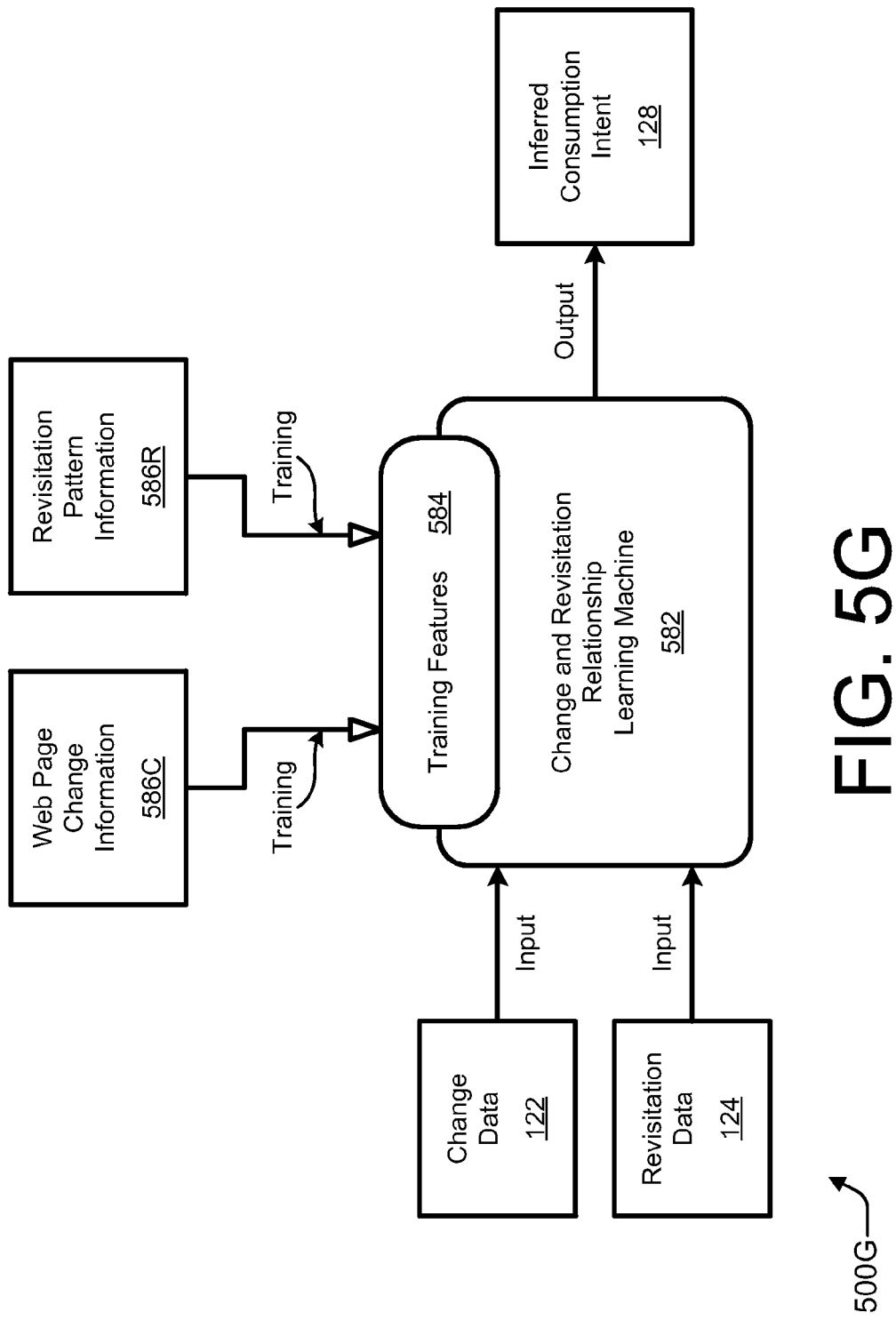
FIG. 5G is a block diagram of an example learning machine embodiment for relating web page change with revisitation patterns.

FIG. 5G is a block diagram 500G of an example learning machine embodiment for relating web page change with revisitation patterns. As illustrated, block diagram 500G includes change data 122, revisitation data 124, a change and revisitation relationship learning machine 582, training features 584, web page change information 586C, revisitation pattern information 586R, and inferred consumption intent 128. For a given web page, change data 122 and revisitation data 124 are input to change and revisitation relationship learning machine 582. In an example operation, change and revisitation relationship learning machine 582 outputs inferred consumption intent 128 in accordance with the training of its learning algorithm.

In an example embodiment, change and revisitation relationship learning machine 582 is capable of implementing the actions of blocks 202-208 of flow diagram 200A (of FIG. 2A). Change and revisitation relationship learning machine 582 may be implemented as web software 104. Hence, change and revisitation relationship learning machine 582 may realize change data analyzer 222, revisitation data analyzer 224, change and revisitation relationship determiner 230, and/or consumption intent inference engine 234 (each of FIG. 2B).

Change and revisitation relationship learning machine 582 may be trained in accordance with standard or specialized learning machine techniques. Training features 584 receive as input change and revisitation features 586 that have already been processed. These training features are web page change information 586C and revisitation pattern information 586R. By way of example, change and revisitation relationship learning machine 582 may be powered by any learning algorithm, including, by way of example but not limitation, support vector machines (SVMs), non-linear classification schemes, including methods referred to as neural networks, genetic algorithms, K-nearest neighbor algorithms, regression models, decision trees, a combination or kernelized version thereof, and so forth. Also, change and revisitation relationship learning machine 582 may be formed from or otherwise include separate learning machines that individually pertain to, e.g., change and/or revisitation, such as a learning machine categorizer 440 (of FIG. 4E).

The change data 122 and revisitation data 124 that are input may be raw data, partially analyzed data, fully analyzed data, some combination thereof, and so forth. Alternatively, change and revisitation relationship learning machine 582 may accept as input at least one change characterization 226 and/or at least one revisitation characterization 228. Web page change information 586C and revisitation pattern information 586R may separately or jointly include change and revisitation data, change and revisitation characteristics, change and revisitation relationships, inferred consumption intents, etc. of previously-processed data. The output of the learned model is a prediction regarding consumption intent, such as a change curve or revisitation curve category, a change or revisitation amount, and so forth.

Figure 6A:
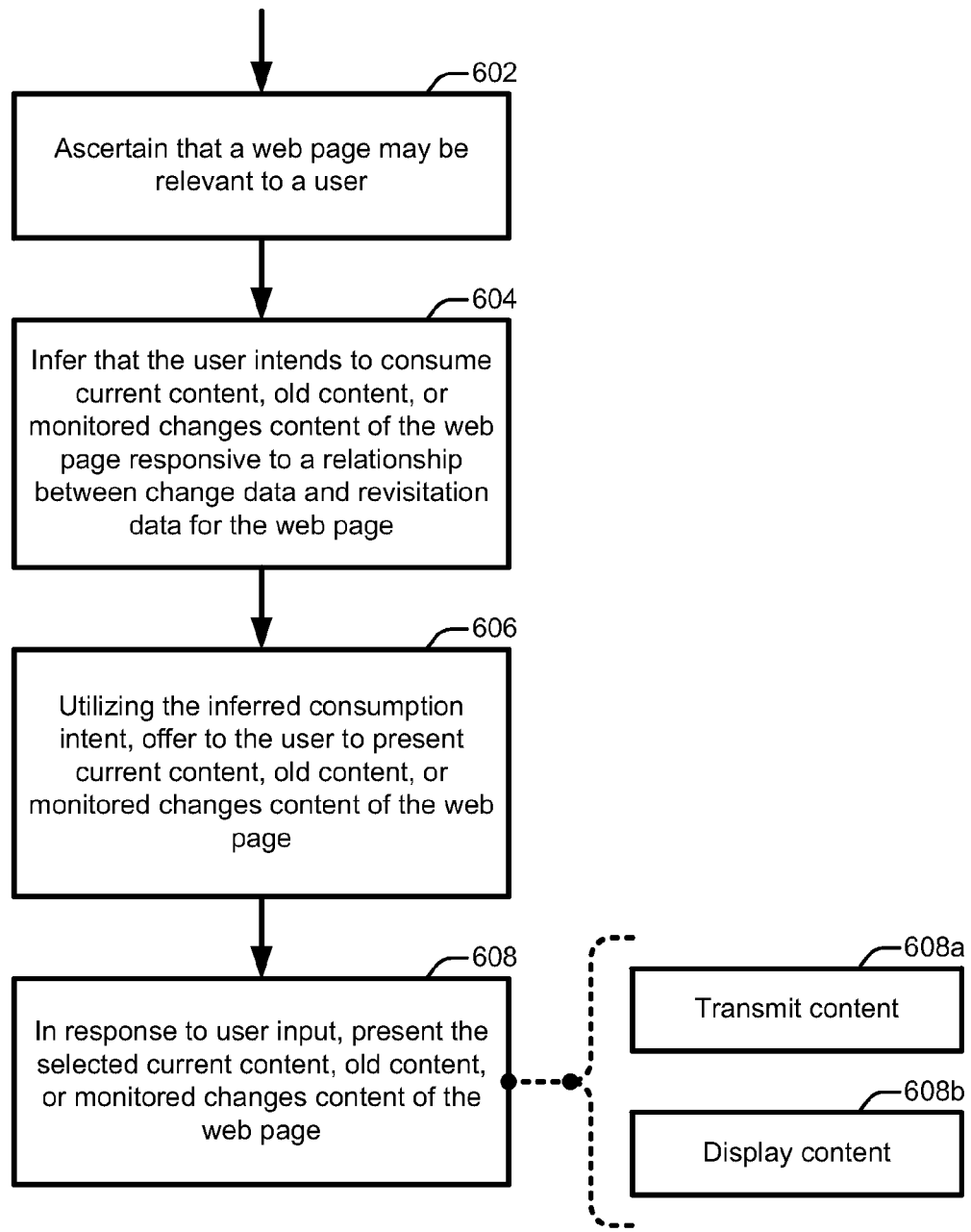
FIG. 6A is a flow diagram that illustrates an example of a method for inferring a user consumption intent and utilizing the inferred consumption intent when relating web page change with revisitation patterns.

6: Example Embodiments for Inferring and Utilizing User Consumption Intentions for Web Page Content FIG. 6A is a flow diagram 600A that illustrates an example of a method for inferring a user consumption intent and utilizing the inferred consumption intent when relating web page change with revisitation patterns. Flow diagram 600A includes six blocks 602-608, 608a, and 608b. Implementations of flow diagram 600A may be realized, for example, as processor-executable instructions and/or as part of web software 104 (of FIG. 1A), including at least partially by the components of FIG. 2B (e.g., by consumption intent inference engine 234 and consumption intent utilizer 130).

In an example embodiment, at block 602, it is ascertained that a web page may be relevant to a user. For example, web software 104 may be specifically directed to web page 102 by a user 106, web software 104 may produce a web search result that is directed to a web page 102, web software 104 may detect through monitoring or reporting that multiple users are repeatedly visiting a web page 102, and so forth.

At block 604, it is inferred that the user intends to consume the current content, old content, or monitored changes content of the web page responsive to a relationship between change data and revisitation data for the web page. For example, consumption intent inference engine 234 may infer that the user intends to consume current content of web page 102. Alternatively, it may be inferred that the user intends to consume old content that was previously accessed. Or it may be inferred that the user wishes to consume content by way of monitoring changes to the web page, such as changes in stock price or other information. These monitored changes can be presented using, for example, a mark up technique such as strikethrough, highlighting, or underline.

At block 606, the web software offers to the user to present the current content, the old content, or the monitored changes content of the web page utilizing the inferred consumption intent. For example, the user can be offered a choice to be presented any one or more of these types of content. Old content may be acquired from a cached version. Monitored changes content may be produced from two or more versions of the content of the web page at different times. Alternatively, the web software may select which type of content to present to the user without offering the user a choice or after offering the user a choice and not receiving a user input.

At block 608, in response to user input (if available), the selected current content, old content, or monitored changes content of the web page is presented. Generally, presentation of content from a web page may entail, for example, transmitting the content (block 608a), displaying the content (block 608b), and so forth.

Figure 6B:
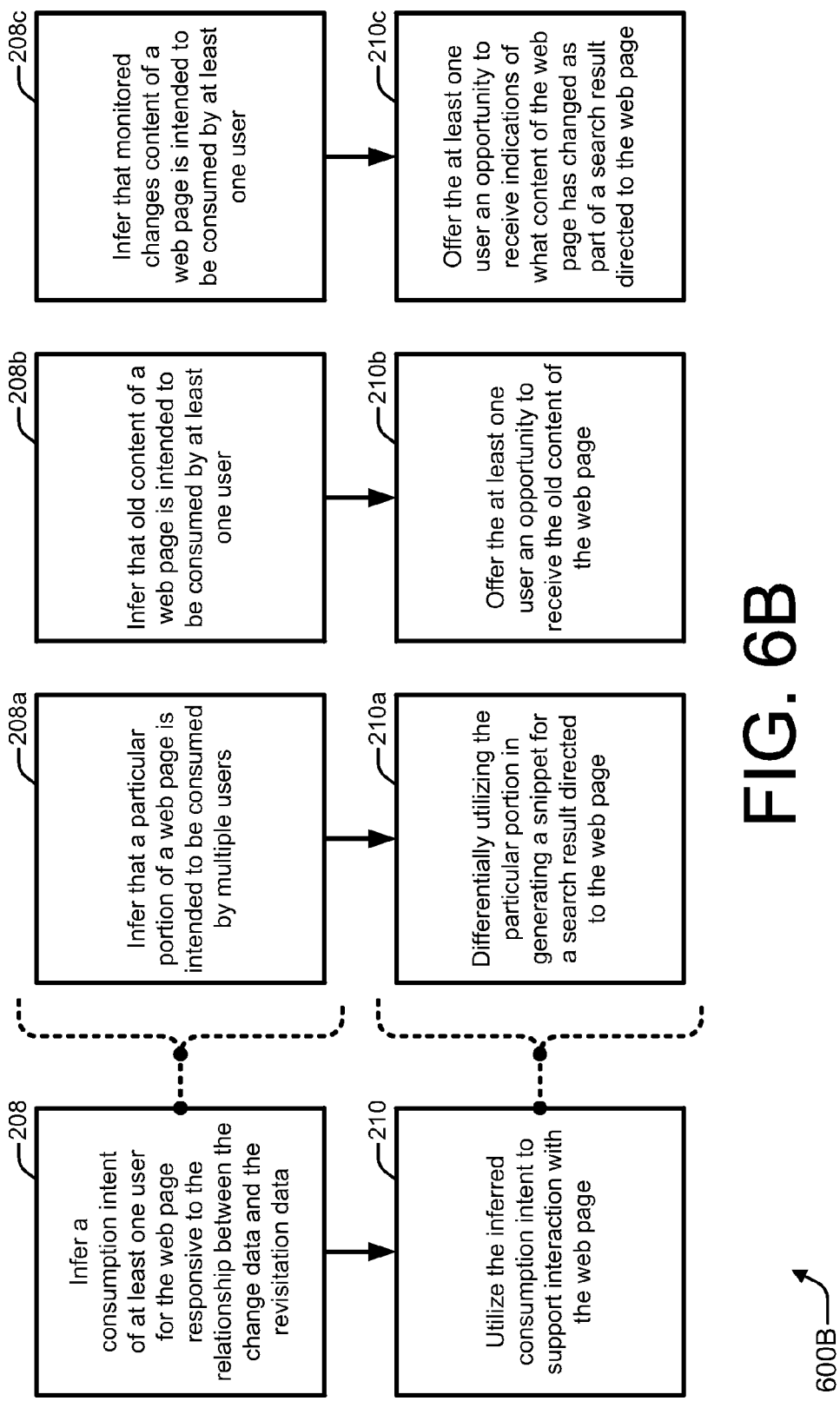
FIG. 6B is a block diagram including flow diagram portions that illustrate example implementations for inferring and utilizing a consumption intent.

FIG. 6B is a block diagram 600B including flow diagram portions that illustrate example implementations for inferring and utilizing a consumption intent. Block diagram 600B includes eight blocks 208, 208a-208c, 210, and 210a-210c. Blocks 208a-208c are example implementations for the act(s) of block 208. Blocks 210a-210c are example implementations for the act(s) of block 210. For block 208, a consumption intent of at least one user is inferred for a web page responsive to a relationship between change data and revisitation data. For block 210, the inferred consumption intent is utilized to support interaction with the web page.

At block 208a, it is inferred that a particular portion of a web page is intended to be consumed by multiple users. For example, it may be inferred that web page portion 522(3) (of FIG. 5D) is intended to be consumed by users. At block 210a, the particular portion is differentially utilized in generating a snippet for a search result that is directed to the web page. For example, the snippet to be presented for a search result may be extracted from the content of web page portion 522(3). The snippet may be primarily but not necessarily entirely extracted from one portion. The snippet may include content from multiple portions, with greater emphasis placed on the portion(s) that appear to be more significant.

At block 208b, it is inferred that old content of a web page is intended to be consumed by at least one user. For example, it may be inferred that old content that is cached from a web page is intended to be consumed by a user responsive to a relationship between change data and revisitation data. At block 210b, an opportunity to receive the old content of the web page is offered to the user. For example, a listing of search results may include a link that is capable, when selected, of presenting cached old content for the corresponding web page. A browser, browser plug-in, proxy server, etc. may also offer to present old content.

At block 208c, it is inferred that monitored changes content of a web page is intended to be consumed by at least one user. For example, it may be inferred that a user intends to monitor how information changes on a web page over time. At block 210c, the at least one user is offered an opportunity to receive indications of what content from the web page has changed as part of a search result directed to the web page. For example, a link of a search result, when selected, may be capable of providing marked-up web page content that indicates how information on the web page has changed. Alternatively, for blocks 210b and 210c, the web software may select without user input whether to present old content, changed content, and so forth. Such selection by the web software may be made without making an offer to the user or after making an offer to the user and not receiving any input.

FIG. 6C is a block diagram 600C including flow diagram portions that illustrate additional example implementations for inferring and utilizing a consumption intent. Block diagram 600C includes eight blocks 208, 208d-208f, 210, and 210d-210f. Blocks 208d-208f are example implementations for the act(s) of block 208. Blocks 210d-210f are example implementations for the act(s) of block 210.

At block 208d, it is inferred that a particular portion of a web page is intended to be consumed by at least one user. For example, it may be inferred that web page portion 522(3) (of FIG. 5D) is intended to be consumed by a user. At block 210d, the particular portion of the web page is emphasized for presentation while at least one other portion of the web page is de-emphasized from presentation. For example, web page portion 522(3) may be selected to be transmitted, displayed, etc. while another web page portion (e.g., 522(1) and/or 522(2)) is excluded from being transmitted or displayed. However, emphasis and de-emphasis may be implemented without relying on an inclusion/exclusion approach. In a bandwidth-constrained scenario, transmitting the desired web page portion, while excluding others, can save bandwidth. In a scenario in which screen space is constrained, such as with many mobile devices, displaying the desired web page portion, while excluding others, can facilitate viewing.

At block 208e, it is inferred that monitored changes of a web page are intended to be consumed by at least one user. For example, it may inferred that a user intends to monitor changing information of a web page. At block 210e, an alert is created for the at least one user when a monitored change is detected. For example, an alert that indicates that the monitored information has changed may be created. The alert may be presented to the user and, it may also include the changed information.

At block 208f, it is inferred that at least one user intends to consume at least a portion of a web page after the portion changes. For example, responsive to a change and revisitation relationship, it may be inferred that a user intends to consume at least a portion of a web page after the portion next changes. At block 210f, the web page or changed portion thereof may be pre-fetched and cached. Because the web page has been pre-fetched, the at least one user has access to the changed portion of the web page in a disconnected scenario. For example, after a page that a user regularly revisits has changed at least a portion thereof, web software may pre-fetch the web page. After a device enters a mobile situation or is otherwise disconnected from the internet, the user may still be presented the changed web page.

7: Example Device Implementations for Relating Web Page Change with Revisitation Patterns FIG. 7 is a block diagram 700 of example devices 702 that may be used to implement embodiments for relating web page change with revisitation patterns. As illustrated, block diagram 700 includes two devices 702a and 702b, human-device interface equipment 712, and one or more network(s) 714. As explicitly shown with device 702a, each device 702 may include one or more input/output interfaces 704, at least one processor 706, and one or more media 708. Media 708 may include processor-executable instructions 710.

For example embodiments, device 702 may represent any processing-capable device. Example devices 702 include personal or server computers, hand-held electronics, entertainment appliances, network components, some combination thereof, and so forth. Device 702a and device 702b may communicate over network(s) 714. Network(s) 714 may be, by way of example but not limitation, an internet, an intranet, an Ethernet, a public network, a private network, a cable network, a digital subscriber line (DSL) network, a telephone network, a wireless network, some combination thereof, and so forth. Human-device interface equipment 712 may be a keyboard/keypad, a touch screen, a remote, a mouse or other graphical pointing device, a screen, a speaker, and so forth.

I/O interfaces 704 may include (i) a network interface for monitoring and/or communicating across network 714, (ii) a display device interface for displaying information on a display screen, (iii) one or more human-device interfaces, and so forth. Examples of (i) network interfaces include a network card, a modem, one or more ports, a network communications stack, a radio, and so forth. Examples of (ii) display device interfaces include a graphics driver, a graphics card, a hardware or software driver for a screen or monitor, and so forth. Examples of (iii) human-device interfaces include those that communicate by wire or wirelessly to human-device interface equipment 712.

Processor 706 may be implemented using any applicable processing-capable technology, and one may be realized as a general-purpose or a special-purpose processor. Examples include a central processing unit (CPU), a microprocessor, a controller, a graphics processing unit (GPU), a derivative or combination thereof, and so forth. Media 708 may be any available media that is included as part of and/or is accessible by device 702. It includes volatile and non-volatile media, removable and non-removable media, storage and transmission media (e.g., wireless or wired communication channels), hard-coded logic media, combinations thereof, and so forth. Media 708 is tangible media when it is embodied as a manufacture and/or as a composition of matter.

Generally, processor 706 is capable of executing, performing, and/or otherwise effectuating processor-executable instructions, such as processor-executable instructions 710. Media 708 is comprised of one or more processor-accessible media. In other words, media 708 may include processor-executable instructions 710 that are executable by processor 706 to effectuate the performance of functions by device 702. Processor-executable instructions 710 may be embodied as software, firmware, hardware, fixed logic circuitry, some combination thereof, and so forth.

Thus, realizations for relating web page change with revisitation patterns may be described in the general context of processor-executable instructions. Processor-executable instructions may include routines, programs, applications, coding, modules, protocols, objects, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

As specifically illustrated, media 708 comprises at least processor-executable instructions 710. Processor-executable instructions 710 may comprise, for example, web software 104 (of FIG. 1) and/or the components of scheme 200B (of FIG. 2B). Generally, processor-executable instructions 710, when executed by processor 706, enable device 702 to perform the various functions described herein. Such functions include, by way of example, those that are illustrated in the various flow diagrams and those pertaining to features illustrated in the block diagrams, as well as combinations thereof, and so forth.

The devices, acts, features, functions, methods, modules, data structures, techniques, components, etc. of FIGS. 1-7 are illustrated in diagrams that are divided into multiple blocks and other elements. However, the order, interconnections, interrelationships, layout, etc. in which FIGS. 1-7 are described and/or shown are not intended to be construed as a limitation, and any number of the blocks and/or other elements can be modified, combined, rearranged, augmented, omitted, etc. in any manner to implement one or more systems, methods, devices, media, apparatuses, arrangements, etc. for relating web page change with revisitation patterns.

Although systems, methods, devices, media, apparatuses, arrangements, and other example embodiments have been described in language specific to structural, logical, algorithmic, and/or functional features, it is to be understood that the invention defined in the appended claims is not necessarily limited to the specific features or acts described above. Rather, the specific features and acts described above are disclosed as example forms of implementing the claimed invention.

What is claimed is:

1. A device comprising:
    one or more processor-accessible tangible media comprising processor-executable instructions; and
    one or more processors, wherein the processor-executable instructions, when executed by the one or more processors, direct the one or more processors to:
        analyze change data of a web page to determine rates of change of web page content of different portions of the web page, the rates of change including a first rate of change at which a first portion of the web page changes and a second rate of change at which a second portion of the web page changes over time;
        analyze revisitation data of the web page to determine a revisitation frequency of the web page, the revisitation data including one or more visit times for visits to the web page by at least one person;
        compare the revisitation frequency of the web page to the first rate of change of the first portion of the web page and the second rate of change of the second portion of the web page; and
        when the revisitation frequency matches the first rate of change of the first portion of the web page, infer that the at least one person revisits the web page to obtain the first portion of the web page.

2. The device of claim 1, wherein the revisitation data identifies instances where the at least one person visited the web page using a web browser.

3. The device of claim 1, wherein the processor-executable instructions direct the one or more processors to:
    when the revisitation frequency does not match the second rate of change, infer that the at least one person does not revisit the web page to obtain the second portion of the web page.

4. The device of claim 1, wherein the first rate of change is greater than the second rate of change.

5. The device of claim 1, wherein the second rate of change is greater than the first rate of change.

6. The device of claim 1, wherein the processor-executable instructions direct the one or more processors to:
    represent the rates of change of the different portions of the web page as corresponding change curves;
    represent the revisitation frequency of the web page as a revisitation curve; and
    compare the revisitation frequency of the web page to the first rate of change and the second rate of change by comparing the change curves to the revisitation curve.

7. A method performed by a device having at least one processor, the method comprising:
    obtaining change data reflecting content change frequencies with which content of different portions of a web page changes over time;
    obtaining revisitation data reflecting a revisitation frequency for the web page, the revisitation frequency being a frequency with which at least one person revisits the web page; and
    identifying a specific portion of the web page with an associated content change frequency that corresponds to the revisitation frequency, the web page having at least one other portion with another content change frequency that does not correspond to the revisitation frequency.

8. The method according to claim 7, further comprising:
    tracking differences in the content of the different portions of the web page over time to obtain the change data.

9. The method according to claim 8, further comprising:
    obtaining the revisitation data from one or more of:
        a web browser;
        a web browser history;
        a server log of a web site;
        a search engine or search engine index;
        a web crawler or web crawler database;
        a web proxy or web proxy log; or
        a browser plug-in or tool bar.

10. The method according to claim 7, further comprising:
    obtaining the change data from one or more of:
        a web browser;
        a web browser history;
        a server log of a web site;
        a search engine or search engine index;
        a web crawler or web crawler database;
        a web proxy or web proxy log; or
        a browser plug-in or tool bar.

11. The method according to claim 7, wherein identifying the specific portion of the web page comprises determining that the associated content change frequency of the specific portion of the web page resonates with the revisitation frequency and determining that the another content change frequency of the at least one other portion of the web page does not resonate with the revisitation frequency.

12. The method according to claim 7, wherein the specific portion of the web page comprises dynamic content of the web page, the method further comprising:

filtering the content of the web page to exclude static content of the web page but not the dynamic content of the web page when delivering the web page to a mobile browser.

13. A device comprising:
one or more processor-accessible tangible media comprising processor-executable instructions; and
one or more processors, wherein the processor-executable instructions, when executed by the one or more processors, direct the one or more processors to:
perform an analysis of change frequencies with which content of different portions of a web page changes over time and a revisitation frequency with which a user revisits the web page; and
based on the analysis, identify a specific portion of the web page with an associated content change frequency that matches the revisitation frequency, the web page having another portion with another content change frequency that does not match the revisitation frequency.

14. The device of claim 13, wherein the web page comprises markup language text.

15. The device of claim 13, wherein the processor-executable instructions direct the one or more processors to:
filter delivery of the content to the user by excluding the another portion of the web page from delivery when delivering the web page to the user.

16. The device of claim 13, wherein the processor-executable instructions direct the one or more processors to:
provide the user with a snippet characterizing the specific portion of the web page instead of another snippet characterizing the another portion of the web page.

17. The device of claim 13, wherein the processor-executable instructions direct the one or more processors to:
detect that the specific portion of the web page has changed; and
in the absence of the user revisiting the web page, notify the user that the specific portion of the web page has changed.

18. The device of claim 13, wherein the processor-executable instructions direct the one or more processors to:
configure a web crawler to revisit the web page and adaptively retrieve the content of the web page based on the associated content change frequency of the specific portion of the web page.

19. The device of claim 13, wherein the processor-executable instructions direct the one or more processors to:
determine that the specific portion of the web page comprises old web page content that is available from a cached version of the web page; and
send the old web page content from the cached version of the web page to the user.

20. The device of claim 13, wherein the specific portion of the web page is identified by determining that the associated content change frequency of the specific portion is mathematically closer to the revisitation frequency than the another content change frequency of the another portion of the web page.

* * * * *